(12) United States Patent
Sasaki et al.

(10) Patent No.: US 8,619,518 B1
(45) Date of Patent: Dec. 31, 2013

(54) THERMALLY-ASSISTED MAGNETIC RECORDING HEAD HAVING EXPANDED NEAR-FIELD LIGHT GENERATING LAYER AND METHOD OF MANUFACTURE

(75) Inventors: Yoshitaka Sasaki, Milpitas, CA (US); Hiroyuki Ito, Milpitas, CA (US); Hironori Araki, Milpitas, CA (US); Shigeki Tanemura, Milpitas, CA (US); Kazuki Sato, Milpitas, CA (US); Ryuji Fujii, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/586,351

(22) Filed: Aug. 15, 2012

(51) Int. Cl.
 *G11B 11/00* (2006.01)
(52) U.S. Cl.
 USPC ................................. 369/13.33; 29/603.07
(58) Field of Classification Search
 USPC .................. 369/13.02, 13.13, 13.32, 13.33; 29/603.07–603.27; 360/59
 See application file for complete search history.

(56) References Cited

U.S. PATENT DOCUMENTS

| 8,456,968 B1 * | 6/2013 | Sasaki et al. | 369/13.33 |
| 2011/0170381 A1 * | 7/2011 | Matsumoto | 369/13.33 |

FOREIGN PATENT DOCUMENTS

| JP | A-2005-004901 | 1/2005 |
| JP | A-2007-164935 | 6/2007 |
| JP | A-2007-257753 | 10/2007 |
| JP | A-2008-257819 | 10/2008 |
| JP | A-2012-003830 | 1/2012 |

* cited by examiner

*Primary Examiner* — Brenda Bernardi
(74) *Attorney, Agent, or Firm* — Oliff & Berridge, PLC

(57) ABSTRACT

A thermally assisted magnetic head includes a main magnetic pole layer, a near-field light generating layer having a generating end part generating near-field light arranged within a medium-opposing surface, and an optical waveguide guiding light to the near-field light generating layer. The optical waveguide has a waveguide end face arranged within the medium-opposing surface and an upper end face on a side closer to the main magnetic pole layer. The thermally assisted magnetic head has an interposed layer which is in direct contact with an outer surface of the optical waveguide. The near-field light generating layer has a near-field light generating part having the generating end part and an expanded part connected with the near-field light generating part. The expanded part has a base part arranged above the upper end face of the optical waveguide and extended base part connected with the base part.

17 Claims, 46 Drawing Sheets

Fig.46
(a)
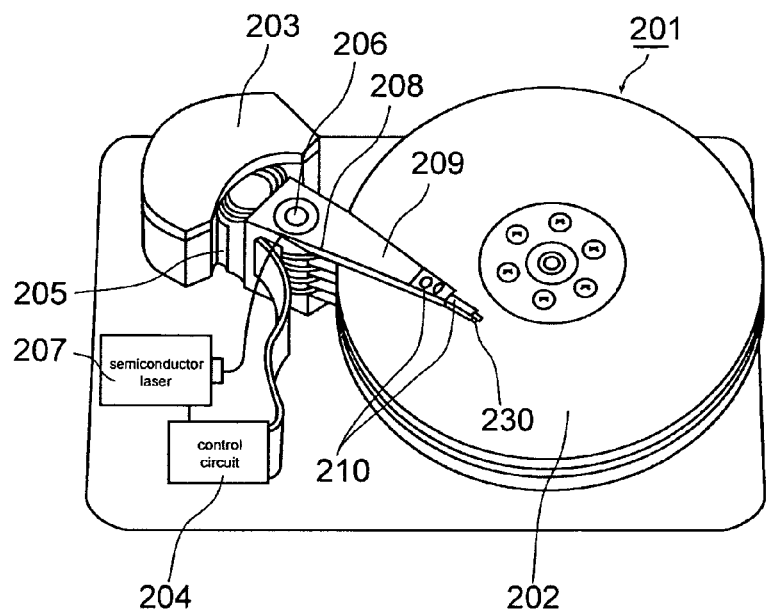
(b)
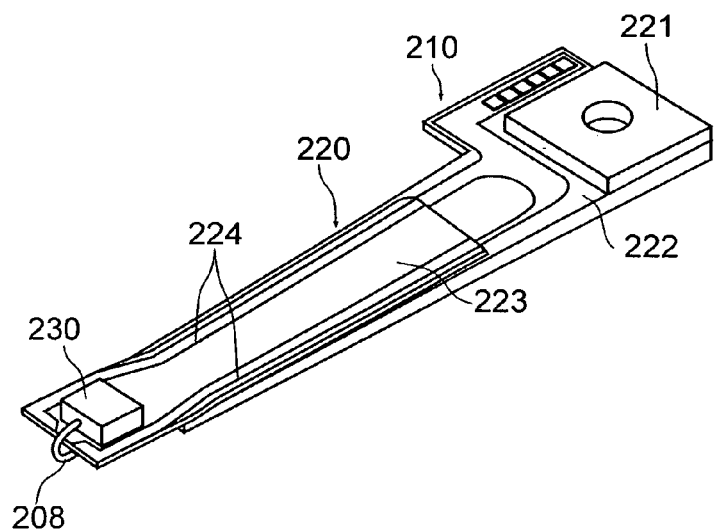

THERMALLY-ASSISTED MAGNETIC RECORDING HEAD HAVING EXPANDED NEAR-FIELD LIGHT GENERATING LAYER AND METHOD OF MANUFACTURE

BACKGROUND

1. Field of the Invention

The present invention relates to a thermally assisted magnetic head recording data on a magnetic recording medium by thermally assisted magnetic recording using near-field light and a method of manufacturing the same, and a head gimbal assembly and a hard disk drive each having a thermally assisted magnetic head.

2. Related Background Art

In recent years, as hard disk drives have been increasing their recording densities, thin-film magnetic heads recording data on magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium.

Known as a method of generating the near-field light in the conventional thermally assisted magnetic head is a method using a plasmon antenna (also called a plasmon probe) that is a minute metal piece. In this method, the near-field light is generated by guiding laser light to the plasmon antenna via an optical waveguide.

As a conventional plasmon antenna, a light scattering body made of metal such as gold, palladium or the like in a triangular thin plate structure is disclosed in Japanese Patent Application Laid-Open No. 2005-4901 (referred also to as patent document 1), for example. Further, a plasmon probe made of metal such as gold, silver, aluminum or the like in the shape of a triangle pole is disclosed in Japanese Patent Application Laid-Open No. 2007-257753 (referred also to as patent document 2). Furthermore, a near-field light generating part in an isosceles triangle including a tip end reaching a medium-opposing surface is disclosed in Japanese Patent Application Laid-Open No. 2007-164935 (referred also to as patent document 3). A near-field light generating part in a triangle pole shape formed on an optical waveguide is disclosed in Japanese Patent Application Laid-Open No. 2012-3830 (referred also to as patent document 4). A near-field light generating part in a triangle shape formed on an optical emitting surface of a medium-opposing surface side of an optical waveguide is disclosed in Japanese Patent Application Laid-Open No. 2008-257819 (referred also to as patent document 5).

SUMMARY OF THE INVENTION

As described above, in the conventional thermally assisted magnetic head, the laser light are guided to the plasmon antenna to excite surface plasmons to generate the near-field light based on the surface plasmons. This near-field light is used as means for heating the magnetic recording medium.

A guide of laser light to a plasmon antenna 402 from an optical waveguide 400 generates the near-field light when the plasmon antenna 402 is formed on the optical waveguide 400 via an interposed layer 401, for example, as illustrated in FIG. 45.

The plasmon antenna, however, generates heat in itself accompanying the generation of the near-field light. In addition, the plasmon antenna has a very small size and made of metal such as gold, silver, aluminum, palladium or the like and thus causes self expansion due to its own heat generation. Then, since the thermally assisted magnetic head has a medium-opposing surface opposing the magnetic recording medium and the plasmon antenna has a tip end portion reaching the medium-opposing surface, the tip end portion projects to approach from the medium-opposing surface to the magnetic recording medium. Thus, the conventional thermally assisted magnetic head has a problem that the medium-opposing surface is likely to project and collide with the magnetic recording medium due to the magnetic recording action. Further, when the plasmon antenna increases in temperature due to the self heat generation, it may melt. Then, the shape of the plasmon antenna is deformed to make it difficult to intensively heat the extremely small recording region of the magnetic recording medium.

Further, when the main magnetic pole layer is arranged very near the plasmon antenna as in the thermally assisted magnetic head disclosed in the aforementioned Patent Document 3, the heat generated by the plasmon antenna is very easily conducted to the main magnetic pole layer. This causes problems of increasing the possibility that the heat deforms the main magnetic pole layer or chips a part of the main magnetic pole layer on the side closer to the medium-opposing surface.

To increase the recording density in a magnetic recording apparatus, a smaller spot diameter of the near-field light is more preferable. To generate the near-field light having a small spot diameter and sufficient intensity, it is effective to concentrate more surface plasmons to the tip end portion of the plasmon antenna. In such a configuration, however, there is another problem that though near-field light having a high electric field intensity is generated from the tip end portion, the generated heat also increases to cause the tip end portion to be more likely to project from the medium-opposing surface and melt.

The present invention is made to solve the above problems, and it is an object to provide a thermally assisted magnetic head having a structure capable of reducing melting and deformation of a plasmon antenna and reducing deformation, melting, chipping of a magnetic pole layer arranged near the plasmon antenna, and a method of manufacturing the same, and a head gimbal assembly and a hard disk drive each including the thermally assisted magnetic head.

To solve the above problems, the present invention is a thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, the optical waveguide has a waveguide end face arranged within the medium-opposing surface, and extends in a depth direction intersecting the medium-opposing surface from the waveguide end face, and has an upper end face on a side closer to the main magnetic pole layer, an interposed layer which is in direct contact with an outer surface of the optical waveguide including the upper end face is provided, the near-field light generating layer has a near-field light generating part having the generating end part and formed above the upper end face of the optical waveguide via the interposed layer, and an expanded part connected with the near-field light generating part at a position more distant from the medium-opposing surface than is the near-field light generating part and formed on an outer surface of the interposed layer, and the expanded part has a base part formed above the upper end face via the interposed layer, and an extended base part formed above a side face of the optical waveguide connected with the upper end face via the interposed layer and connected with the base part.

In the thermally assisted magnetic head, the near-field light generating layer has the near-field light generating part and the expanded part, and the expanded part has the base part and the extended base part, so that the heat generated by the near-field light generating part can be led by the expanded part to a place distant from the generating end part. The expanded part exhibits a function as a heat radiating layer radiating the heat to the outside of the near-field light generating part.

In the above-described thermally assisted magnetic head, it is preferable that the optical waveguide further has a lower end face on a side distance from the main magnetic pole layer and opposed to the upper end face, and the expanded part of the near-field light generating layer further has a bottom base part connected with the extended base part and formed along the lower end face via the interposed layer.

Since the expanded part has the bottom base part, a large part more distant from the near-field light generating part than is the base part is secured in the expanded part.

Further, in the above-described thermally assisted magnetic head, it is preferable that the optical waveguide further has a lower end face on a side distance from the main magnetic pole layer and opposed to the upper end face, and the extended base part of the near-field light generating layer have an opposing arrangement structure in which the extended base part is formed to be opposed to each other with the optical waveguide and the interposed layer intervening therebetween.

Also in this case, the expanded part has the extended base part in the opposing arrangement structure, whereby a larger part more distant from the near-field light generating part than is the base part is secured in the expanded part.

Further, in the above-described thermally assisted magnetic head, it is preferable that the optical waveguide further has a lower end face on a side distance from the main magnetic pole layer and opposed to the upper end face, and the expanded part of the near-field light generating layer includes the base part, the extended base part, and a bottom base part formed along the lower end face via the interposed layer, and has a ring-like structure in which the expanded part is formed to surround the optical waveguide and the interposed layer.

In this case, since the expanded part has the bottom base part and the extended base parts in the opposing arrangement structure, a much larger part more distant from the near-field light generating part than is the base part is secured in the expanded part.

Further, in the above-described thermally assisted magnetic head, it is preferable that the optical waveguide further has a lower end face on a side distance from the main magnetic pole layer and opposed to the upper end face, and the expanded part of the near-field light generating layer includes the base part, the extended base part, and a bottom base part formed along the lower end face via the interposed layer, and has a spiral structure in which the expanded part is wound in a spiral form around the optical waveguide and the interposed layer.

Further, it is possible that the optical waveguide has a rod-shaped part arranged at a position distant from the medium-opposing surface, a reduced thickness part smaller in thickness than the rod-shaped part and having the waveguide end face, and a connecting part connecting the rod-shaped part to the reduced thickness part while gradually reducing in diameter, and the expanded part of the near-field light generating layer has a ring-like structure in which the expanded part is formed to surround the reduced thickness part of the optical waveguide and the interposed layer.

Further, it is possible that the expanded part of the near-field light generating layer has a tilt structure in which the bottom base part is arranged at a position more distant from the medium-opposing surface than is the base part.

It is possible that the near-field light generating layer has a bimetallic structure in which two metal layers are laminated and the respective metal layers are made of different kinds of metals.

Further, it is possible that the optical waveguide has a rod-shaped part arranged at a position distant from the medium-opposing surface and formed in a rectangular parallelepiped shape, and a reduced thickness part formed in a rectangular parallelepiped shape smaller in thickness than the rod-shaped part and having the waveguide end face, and the interposed layer surrounds substantially the whole outer surface of the optical waveguide including the rod-shaped part and the reduced thickness part except the waveguide end face.

It is preferable that the base part has a large width structure in which a width thereof in a direction along the medium-opposing surface is larger than a largest width of the near-field light generating part along the medium-opposing surface.

Further, the present invention provides a method of manufacturing a thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, including the following steps (1) to (3):

(1) an optical waveguide forming step of forming an optical waveguide on a surface of a laminated body to have a rectangular parallelepiped-shape part on a side of a planned medium-opposing surface position which will become the medium-opposing surface afterward;

(2) an interposed layer forming step of forming an interposed layer using a dielectric substance on a side face and an upper end face of the optical waveguide;

(3) a near-field light generating layer forming step of forming a near-field light generating layer by forming an expanded part having an extended base part in contact with a part of the interposed layer arranged on the side face of the optical waveguide and a base part connected with the extended base part, at a position distant from the planned medium-opposing surface position, and forming a near-field light generating part having the generating end part and arranged above the upper end face of the optical waveguide via the interposed layer in a manner to be connected with the base part.

In the above-described method of manufacturing, it is preferable that in the near-field light generating layer forming step, the expanded part is formed to have an opposing arrangement structure in which the extended base part is arranged to be opposed to each other with the optical waveguide and the interposed layer intervening therebetween.

Further, it is possible that in the near-field light generating layer forming step, the expanded part is formed to wind in a spiral form around the optical waveguide and the interposed layer.

Further, the present invention provides a method of manufacturing a thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, including the following steps (4) to (11):

(4) an embedded metal layer forming step of forming in a depression an embedded metal layer which will be a part of the near-field light generating layer afterward by forming a base insulating layer and then forming the depression at a position, on a surface of the base insulating layer, distant from a planned medium-opposing surface position which will become the medium-opposing surface;

(5) a first dielectric substance layer forming step of forming, on a surface of a laminated body, a first dielectric substance layer in a band shape extending in a depth direction intersecting the medium-opposing surface from the planned medium-opposing surface position while covering a part of the embedded metal layer except both end parts along the medium-opposing surface;

(6) an optical waveguide forming step of forming an optical waveguide to cover a part of the first dielectric substance layer except both side parts along the medium-opposing surface;

(7) a second dielectric substance layer forming step of forming a second dielectric substance layer on the surface of the laminated body;

(8) a flattening step of flattening the surface of the laminated body by polishing the surface of the laminated body until a surface of the optical waveguide is exposed;

(9) a third dielectric substance layer forming step of forming a third dielectric substance layer on the surface of the laminated body;

(10) an interposed layer forming step of forming an interposed layer from the first dielectric substance layer, and the second dielectric substance layer and the third dielectric substance layer left by removing parts of the second dielectric substance layer and the third dielectric substance layer outside the first dielectric substance layer;

(11) a near-field light generating layer forming step of forming a near-field light generating layer by forming an expanded part having extended base parts connected with the embedded metal layer and a base part connected with the extended base parts, and forming a near-field light generating part having the generating end part in a manner to be connected with the base part.

Further, it is preferable that in the optical waveguide forming step, the optical waveguide is formed to have a rod-shaped part arranged at a position distant from the planned medium-opposing surface position, a reduced thickness part smaller in thickness than the rod-shaped part and reaching the planned medium-opposing surface position, and a connecting part connecting the rod-shaped part to the reduced thickness part while gradually reducing in diameter, and the expanded part of the near-field light generating layer is formed to surround the reduced thickness part of the optical waveguide and the interposed layer.

Further, the present invention provides a head gimbal assembly including a slider having a thermally assisted magnetic head formed thereon, the thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, the optical waveguide has a waveguide end face arranged within the medium-opposing surface, and extends in a depth direction intersecting the medium-opposing surface from the waveguide end face, and has an upper end face on a side closer to the main magnetic pole layer, an interposed layer which is in direct contact with an outer surface of the optical waveguide including the upper end face is provided, the near-field light generating layer has a near-field light generating part having the generating end part and formed above the upper end face of the optical waveguide via the interposed layer, and an expanded part connected with the near-field light generating part at a position more distant from the medium-opposing surface than is the near-field light generating part and formed on an outer surface of the interposed layer, and the expanded part has a base part formed above the upper end face via the interposed layer, and an extended base part formed above a side face of the optical waveguide connected with the upper end face via the interposed layer and connected with the base part.

Further, the present invention provides a hard disk drive including a head gimbal assembly having a thermally assisted magnetic head, and a magnetic recording medium opposing the thermally assisted magnetic head, the thermally assisted magnetic head including a main magnetic pole layer having a magnetic pole end face arranged within a medium-opposing surface opposing the magnetic recording medium; a near-field light generating layer having a generating end part arranged within the medium-opposing surface, the generating end part generating near-field light for heating the magnetic recording medium; and an optical waveguide guiding light to the near-field light generating layer, the optical waveguide has a waveguide end face arranged within the medium-opposing surface, and extends in a depth direction intersecting the medium-opposing surface from the waveguide end face, and has an upper end face on a side closer to the main magnetic pole layer, an interposed layer which is in direct contact with an outer surface of the optical waveguide including the upper end face is provided, the near-field light generating layer has a near-field light generating part having the generating end part and formed above the upper end face of the optical waveguide via the interposed layer, and an expanded part connected with the near-field light generating part at a position more distant from the medium-opposing surface than is the near-field light generating part and formed on an outer surface of the interposed layer, and the expanded part has a base part formed above the upper end face via the interposed layer, and an extended base part formed above a side face of the optical waveguide connected with the upper end face via the interposed layer and connected with the base part.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 46 (*a*) is a perspective view illustrating a hard disk drive equipped with a thin-film magnetic head in FIG. 1, FIG. 41 (*b*) is a perspective view illustrating a rear side of HGA.

DETAILED DESCRIPTION OF THE EMBODIMENTS

In the following, embodiments of the present invention will be described with reference to the drawings. Note that the same components will be referred to with the same numerals or letters, while omitting their overlapping descriptions.
(Structures of Thermally Assisted Magnetic Head)

To begin with, the structure of a thermally assisted magnetic head will be described with reference to FIG. 1 to FIG. 8.

Figure 1:
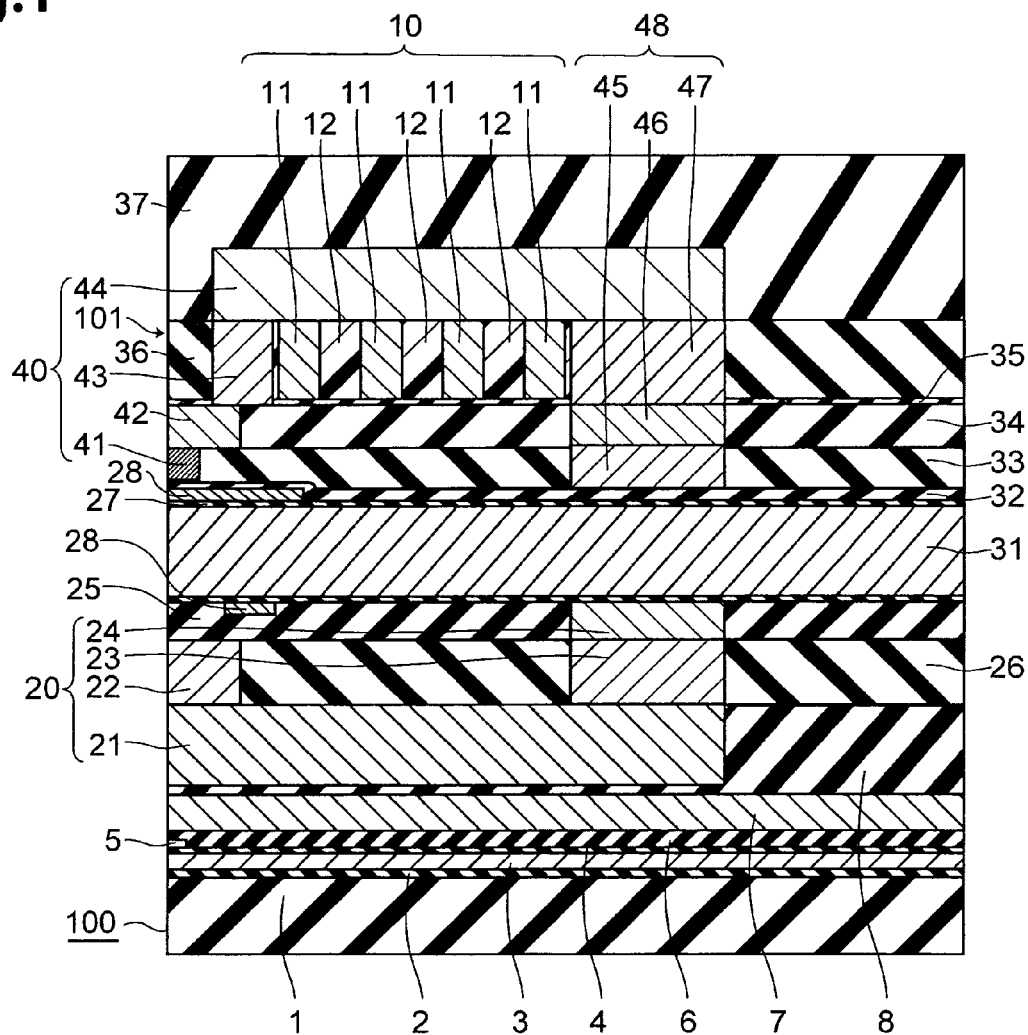
FIG. 1 is a sectional view of the thermally assisted magnetic head in accordance with an embodiment of the present invention taken along the line 1-1 of FIG. 2, which is a direction intersecting its ABS.
Figure 2:
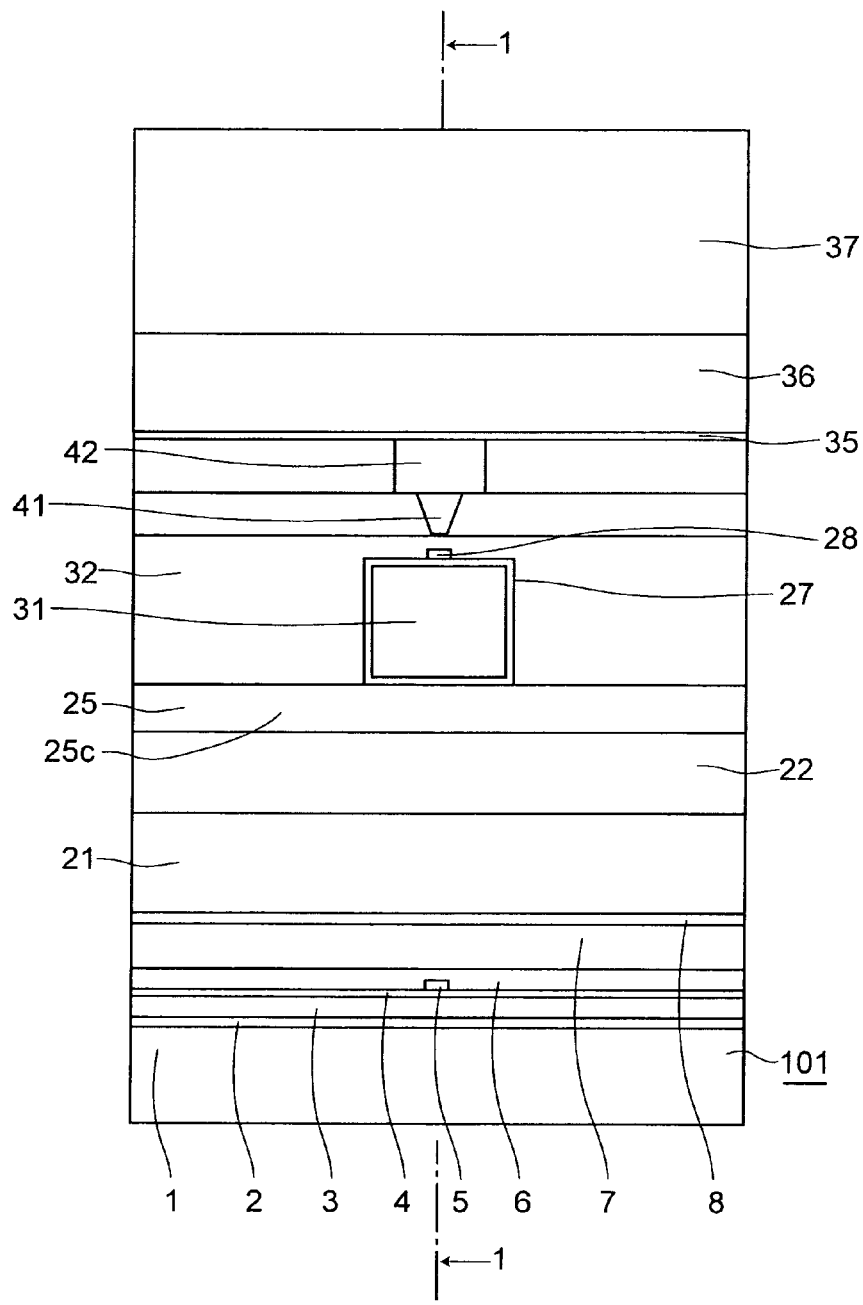
FIG. 2 is a front view illustrating the ABS of the thermally assisted magnetic head.
Figure 3:
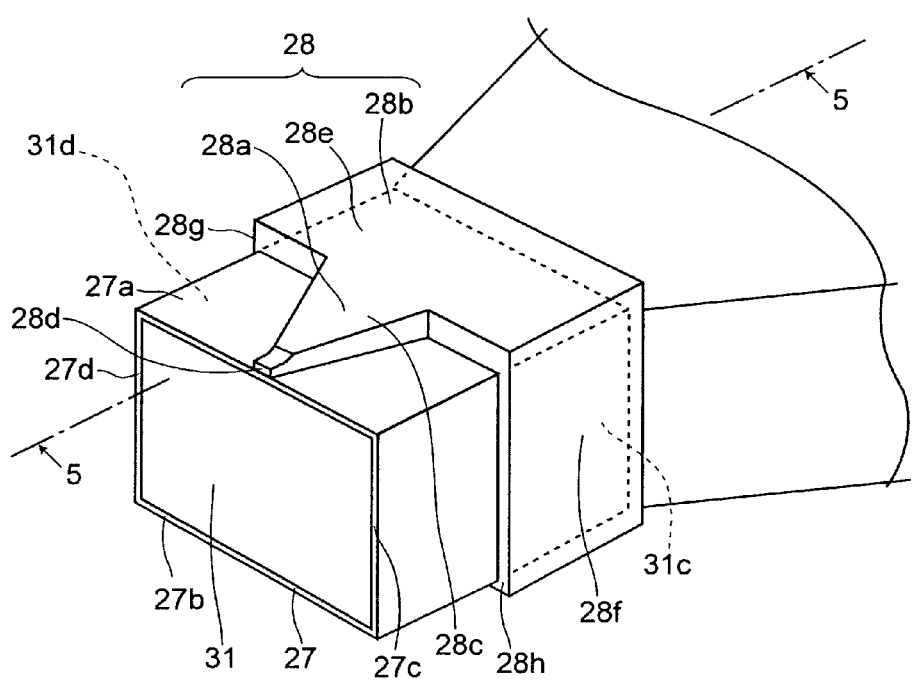
FIG. 3 is a perspective view illustrating an interposed layer, a near-field light generating layer and an optical waveguide of the thermally assisted magnetic head in FIG. 1.
Figure 4:
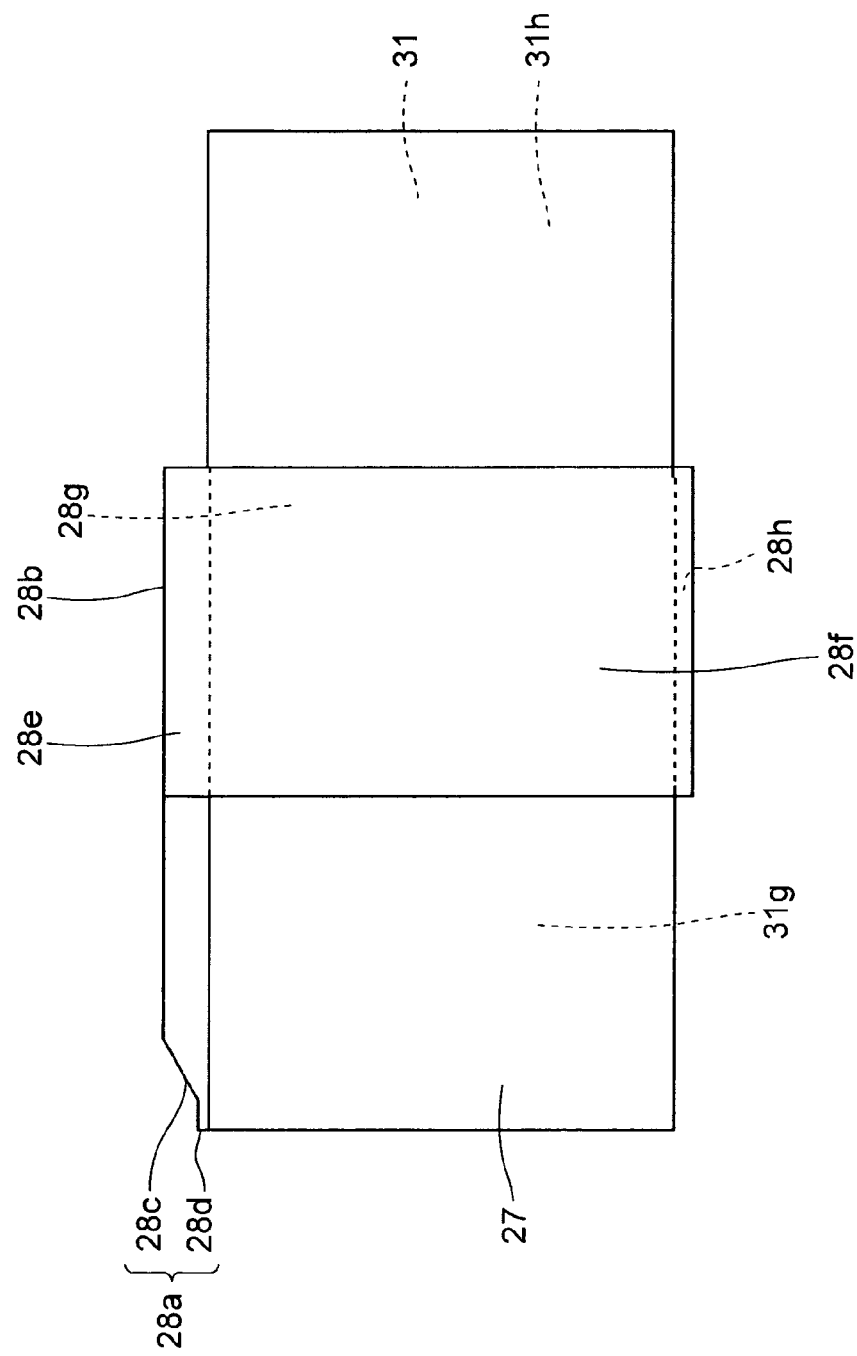
FIG. 4 is a side view illustrating an interposed layer, a near-field light generating layer and an optical waveguide of the thermally assisted magnetic head in FIG. 1.
Figure 5:
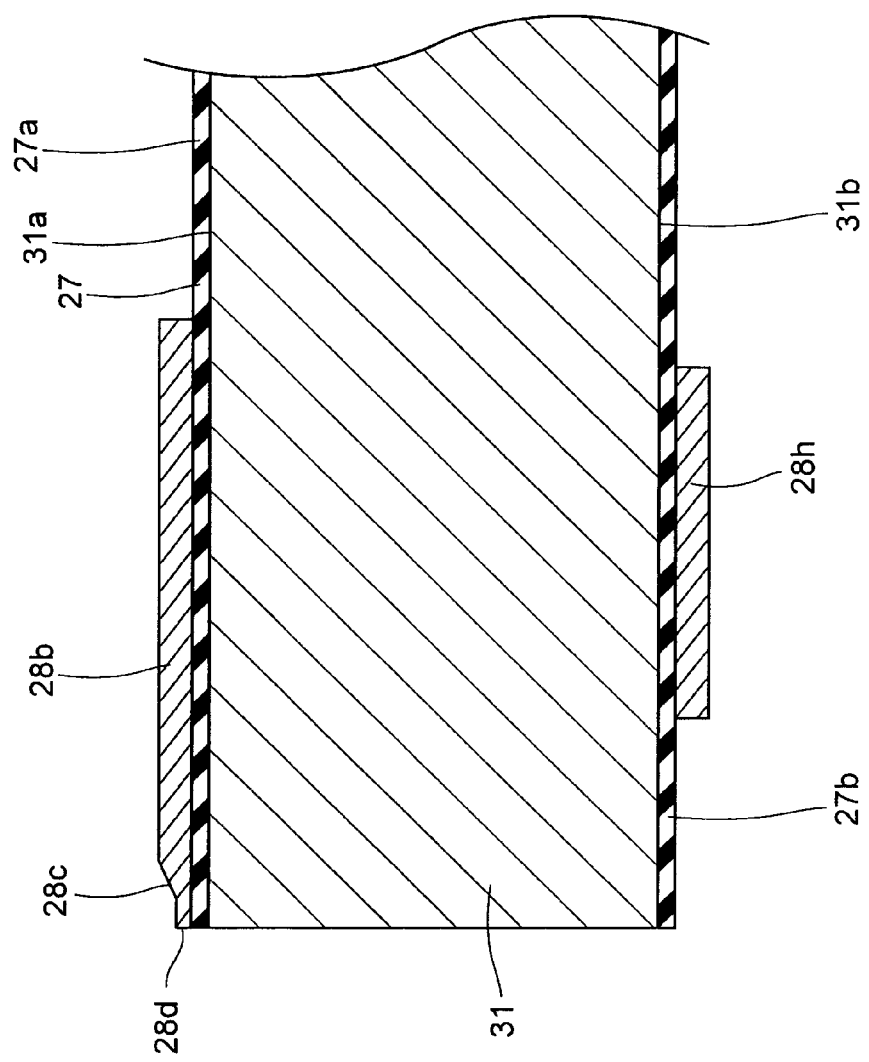
FIG. 5 is a sectional view taken along the line 5-5 in FIG. 3.
Figure 6:
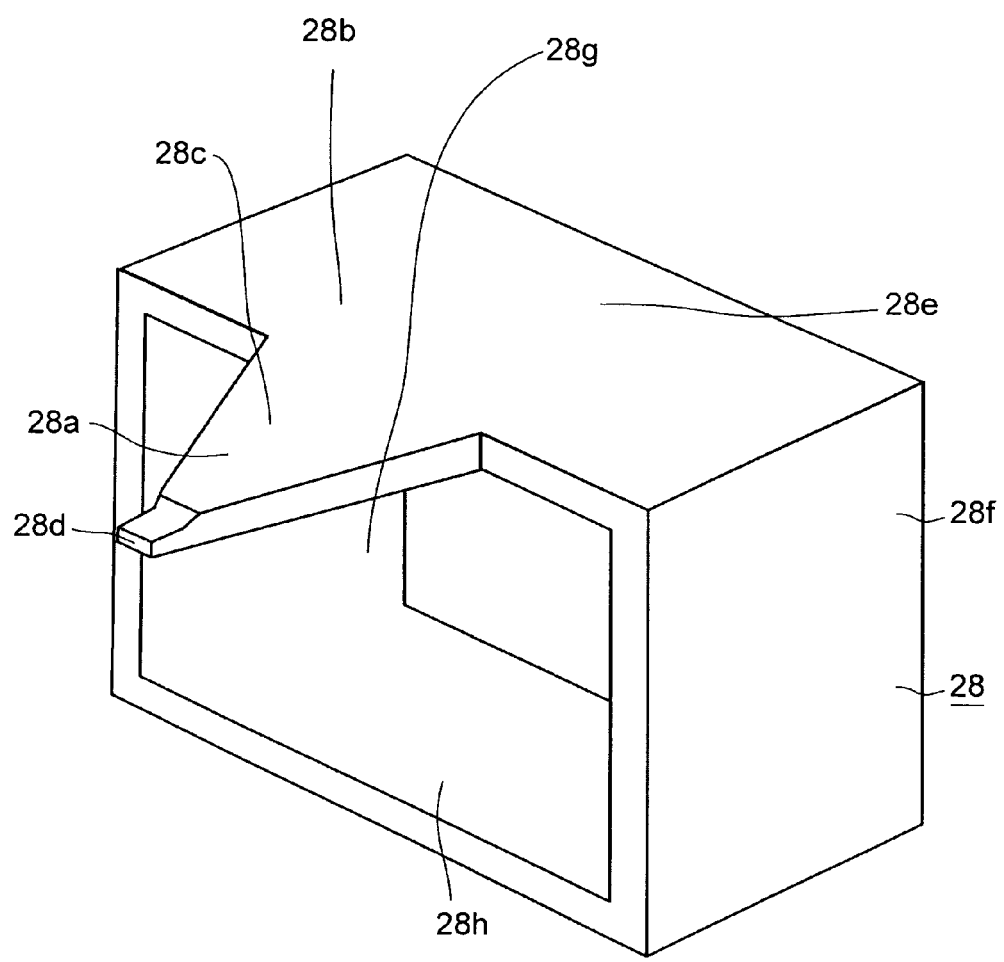
FIG. 6 is a perspective view illustrating the near-field light generating layer.
Figure 7:
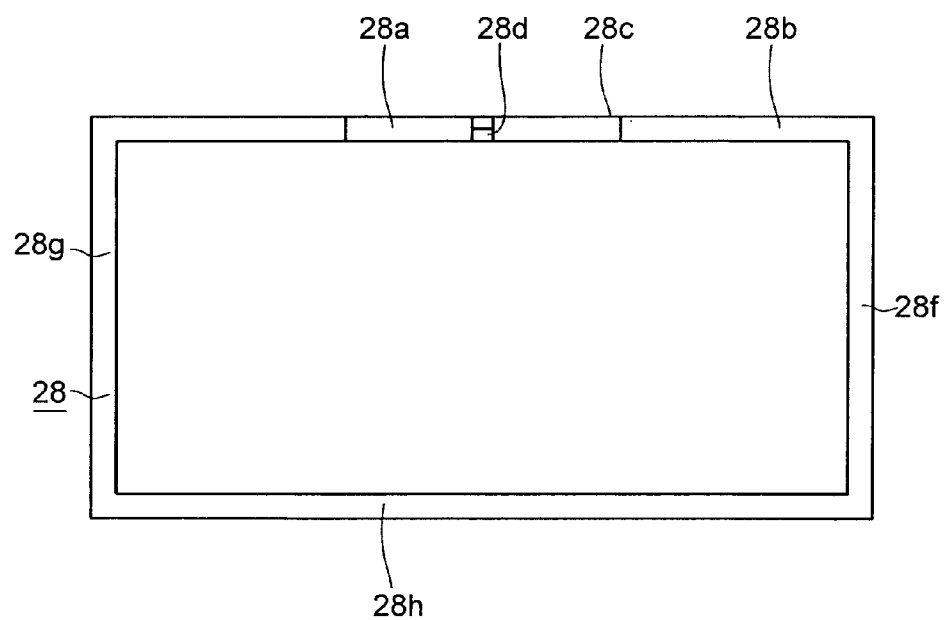
FIG. 7 is a front view illustrating the near-field light generating layer.
Figure 8:
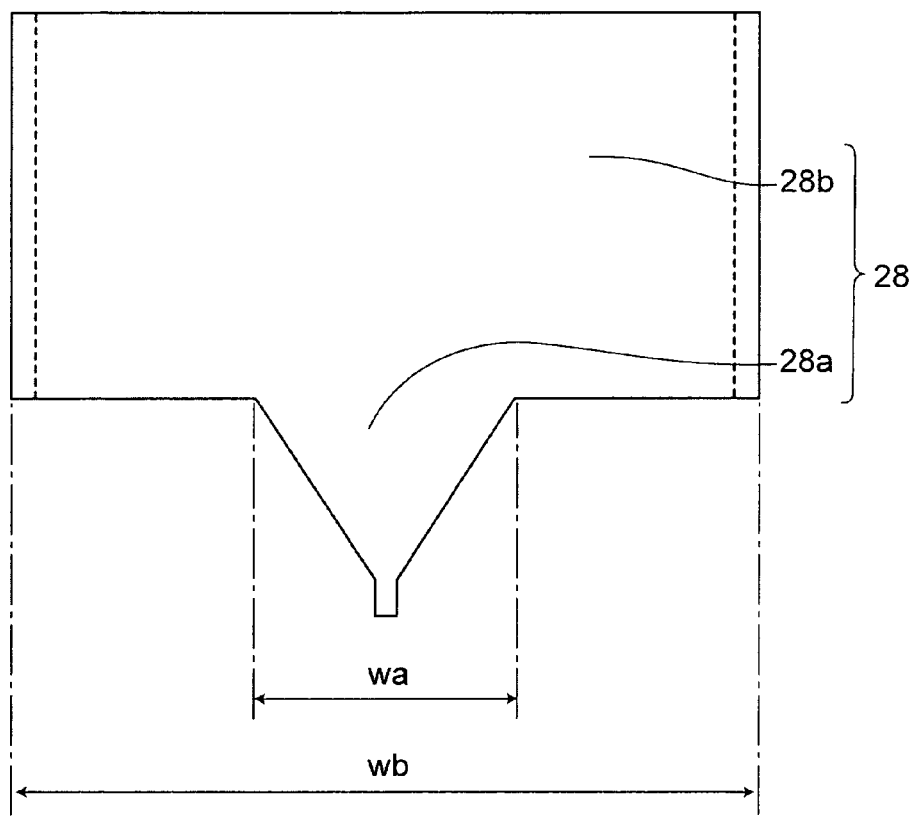
FIG. 8 is a plan view illustrating the near-field light generating layer.

Here, FIG. 1 is a sectional view of a thermally assisted magnetic head 100 in accordance with an embodiment of the present invention taken along the line 1-1 of FIG. 2, which is a direction intersecting with an air bearing surface (which will hereinafter be referred also to as "ABS"), while FIG. 2 is a front view illustrating an ABS 101 of the thermally assisted magnetic head 100. FIG. 3 is a perspective view illustrating an interposed layer 27, a near-field light generating layer 28 and an optical waveguide 31. FIG. 4 is a side view illustrating the interposed layer 27, the near-field light generating layer 28 and the optical waveguide 31. FIG. 5 is a sectional view taken along the line 5-5 in FIG. 3. Further, FIG. 6 is a perspective view illustrating the near-field light generating layer 28. FIG. 7 is a front view illustrating the near-field light generating layer 28, and FIG. 8 is a plan view illustrating the near-field light generating layer 28.

In the thermally assisted magnetic head 100, the near-field light generating layer 28 has, as illustrated in FIG. 3 to FIG. 8, a near-field light generating part 28*a* and an expanded part 28*b* connected with the near-field light generating part 28*a* and thereby easily radiates heat generated by the near-field light generating layer 28 to the outside and increases in generation efficiency of near-field light as well. Therefore, melting and deformation of the near-field light generating layer 28 are prevented, and deformation, melting and chipping of a main magnetic pole layer 40 arranged near the near-field light generating layer 28 are also prevented.

Note that the right and left direction (horizontal direction) in FIG. 2 is the track width direction, the upper direction is the moving direction of a magnetic recording medium, and the direction perpendicular to the paper surface is the direction perpendicular to the surface of the magnetic recording medium.

Thermally assisted magnetic head 100 comprises a substrate 1, reproducing head and recording head laminated on the substrate 1, while having the ABS 101 as a medium-opposing surface opposing a magnetic recording medium, as illustrated in FIG. 1.

The following will explain structures of main parts of the thermally assisted magnetic head 100, while structures of parts other than the main parts will later be explained in manufacturing processes.

The reproducing head has an MR device 5, arranged near the ABS 101, for detecting a magnetic signal. The reproducing head comprises a lower shield layer 3, a lower shield gap film 4, an upper shield gap film 6 and an upper shield layer 7.

An insulating layer 2 is further formed on the substrate 1, and the lower shield layer 3 made of a magnetic material is formed on the insulating layer 2. The lower shield gap film 4 as an insulating film is further formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The GMR device may be of a CIP (Current In Plane) type or a CPP (Current Perpendicular to Plane) type. In the CIP type, current for detecting a magnetic signal flows in a direction almost parallel to planes of the layers constituting the GMR device. In the CPP type, current for detecting a magnetic signal flows in a direction almost perpendicular to planes of the layers constituting the GMR device.

Next, the recording head will be explained. The recording head has a thin-film coil 10, a return magnetic pole layer 20, a base insulating layer 25, the interposed layer 27, the near-field light generating layer 28, the optical waveguide 31, a main magnetic pole layer 40, and a linking magnetic pole layer 48, and has a structure in which they are stacked on the substrate 1.

The thin-film coil 10 has four turn parts 11. The thin-film coil 10 is wound like a flat spiral about the linking magnetic pole layer 48. The respective turn parts 11 are insulated from each other by a photoresist 12.

A current modulated according to data to be recorded on the magnetic recording medium flows through the thin-film coil 10, the current causes the thin-film coil 10 to generate a recording magnetic field.

The return magnetic pole layer 20 has a connecting magnetic pole layer 21, a front magnetic pole layer 22, a first rear magnetic pole layer 23 and a second rear magnetic pole layer 24. The connecting magnetic pole layer 21 has an end face arranged within the ABS 101 and has a part that is more distant from the ABS 101 than is the end face being embedded in the insulating layer 8. Further, to the connecting magnetic pole layer 21, the front magnetic pole layer 22 is junctioned on the side closer to the ABS 101 than is the thin-film coil 10, and the first rear magnetic pole layer 23 is junctioned at a position more distant from the ABS 101 than is the four turn parts 11 of the thin-film coil 10.

The front magnetic pole layer 22 has an end face arranged within the ABS 101 similar with the connecting magnetic pole layer 21. The front magnetic pole layer 22 is junctioned to the connecting magnetic pole layer 21 on a side closer to the ABS 101 than is the thin-film coil 10.

The first rear magnetic pole layer 23 is arranged at a position more distant from the ABS 101 than is the four turn parts 11 of the thin-film coil 10, and is junctioned to the connecting magnetic pole layer 21 and the second rear magnetic pole layer 24.

The return magnetic pole layer 20 is provided to return a magnetic flux to the main magnetic pole layer 40. When a magnetic flux generated by the recording magnetic field is emitted from a later-described magnetic pole end face 41a of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 48 and reaches the main magnetic pole layer 40.

Figure 12:
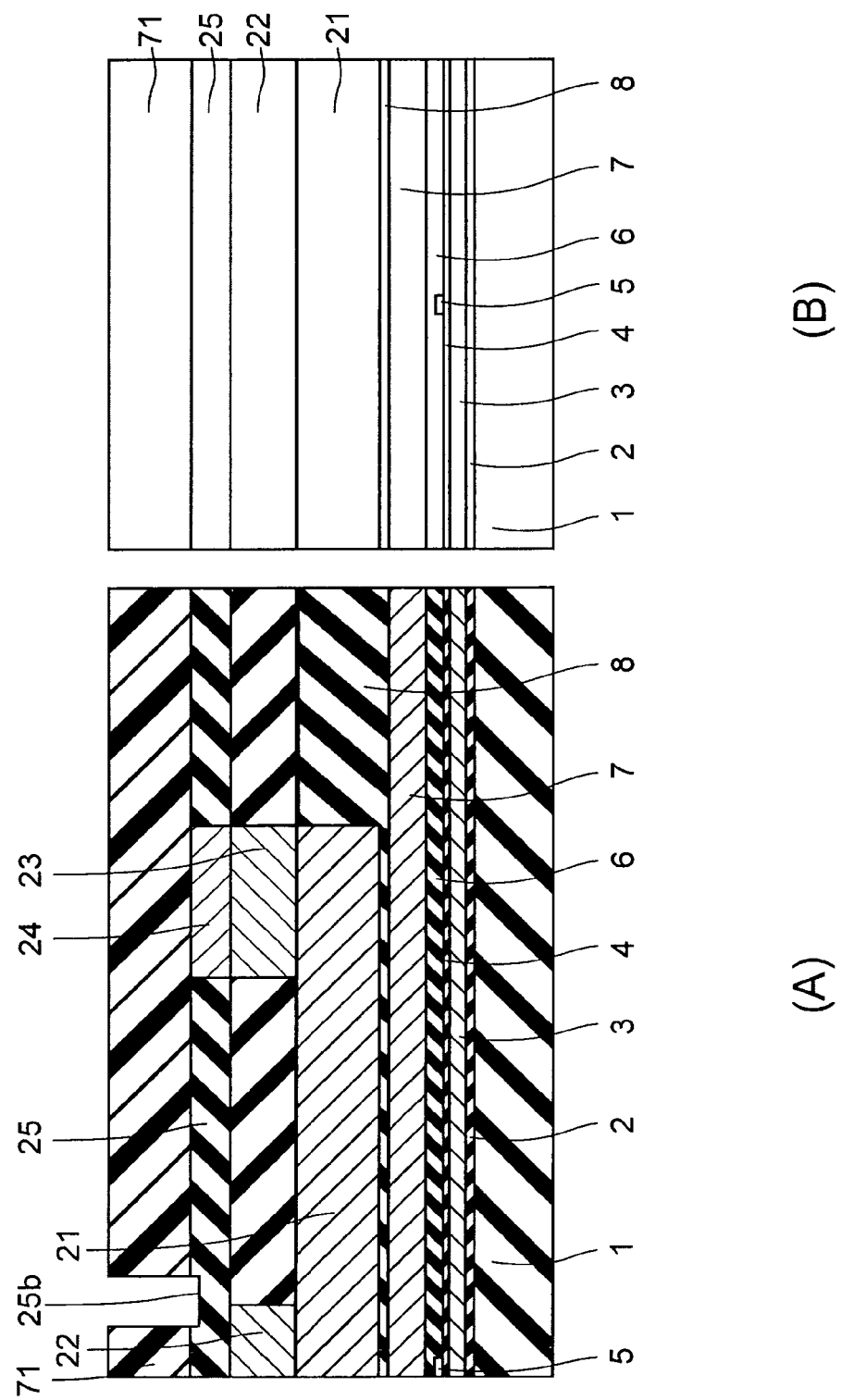
FIG. 12 is a view illustrating a process subsequent to that in FIG. 11, in which (A) is a sectional view corresponding to FIG. 1, (B) is a front view corresponding to FIG. 2.
Figure 13:
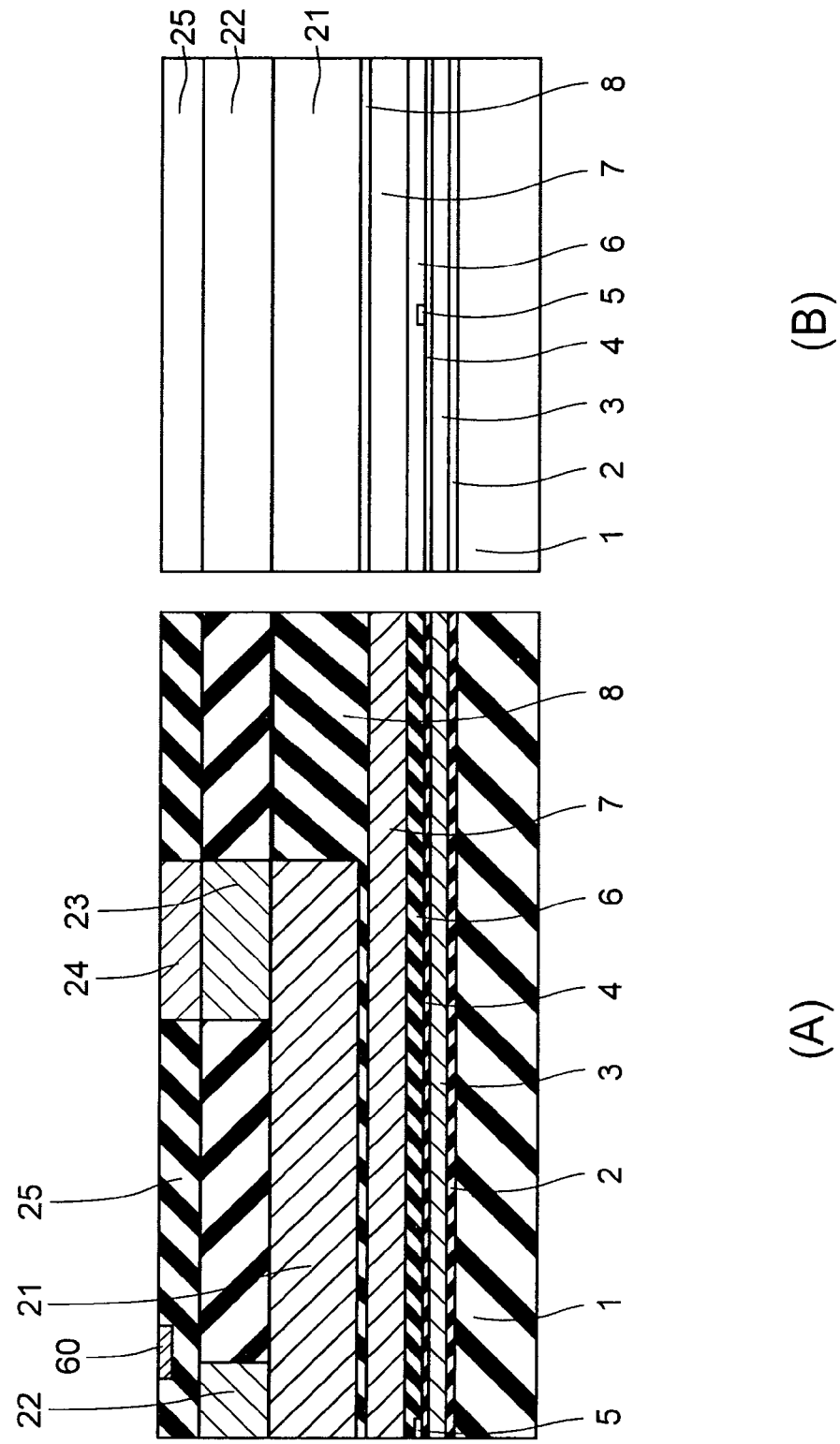
FIG. 13 is a view illustrating a process subsequent to that in FIG. 12, in which (A) is a sectional view corresponding to FIG. 1, (B) is a front view corresponding to FIG. 2.
Figure 14:
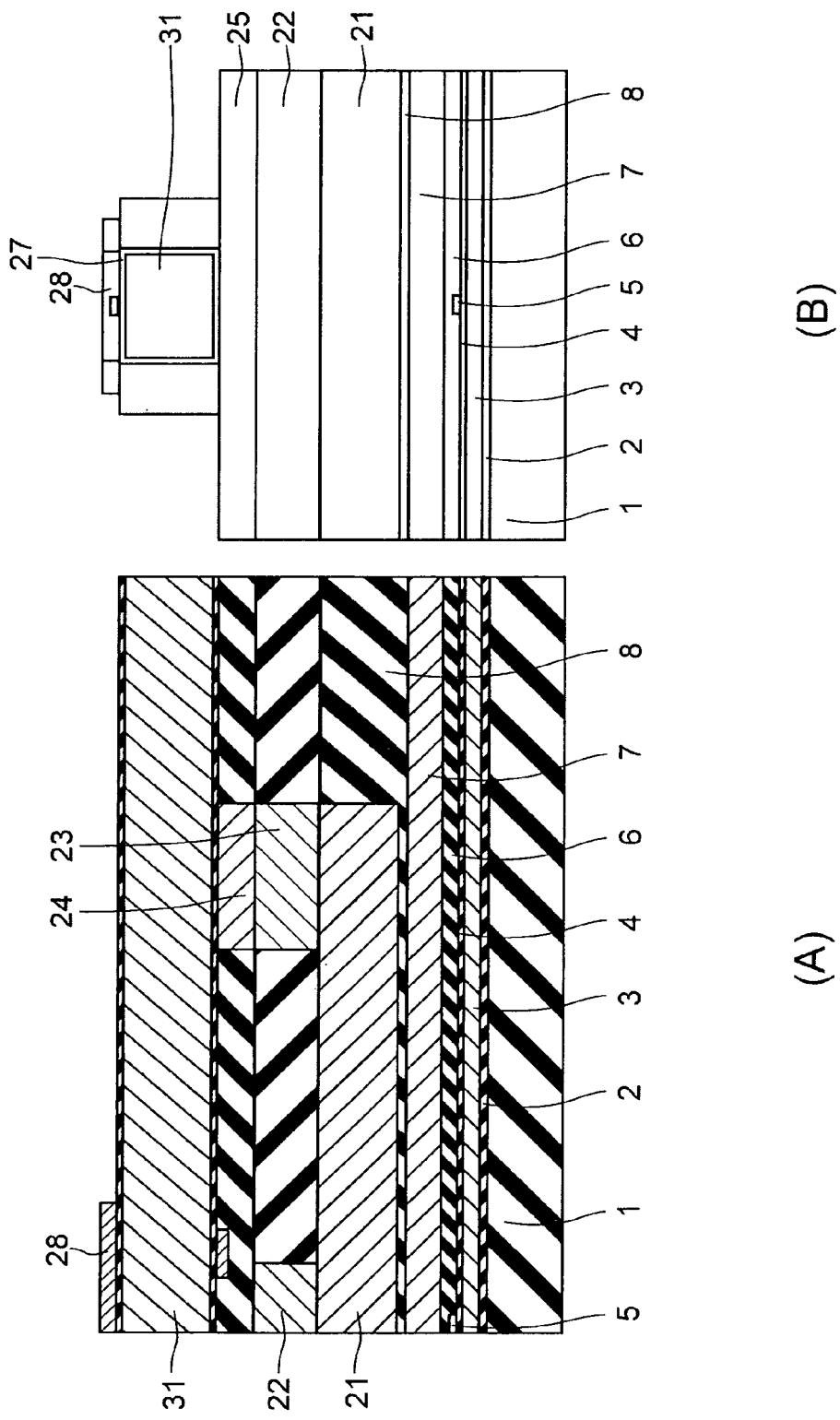
FIG. 14 is a view illustrating a process subsequent to that in FIG. 13, in which (A) is a sectional view corresponding to FIG. 1, (B) is a front view corresponding to FIG. 2.
Figure 15:
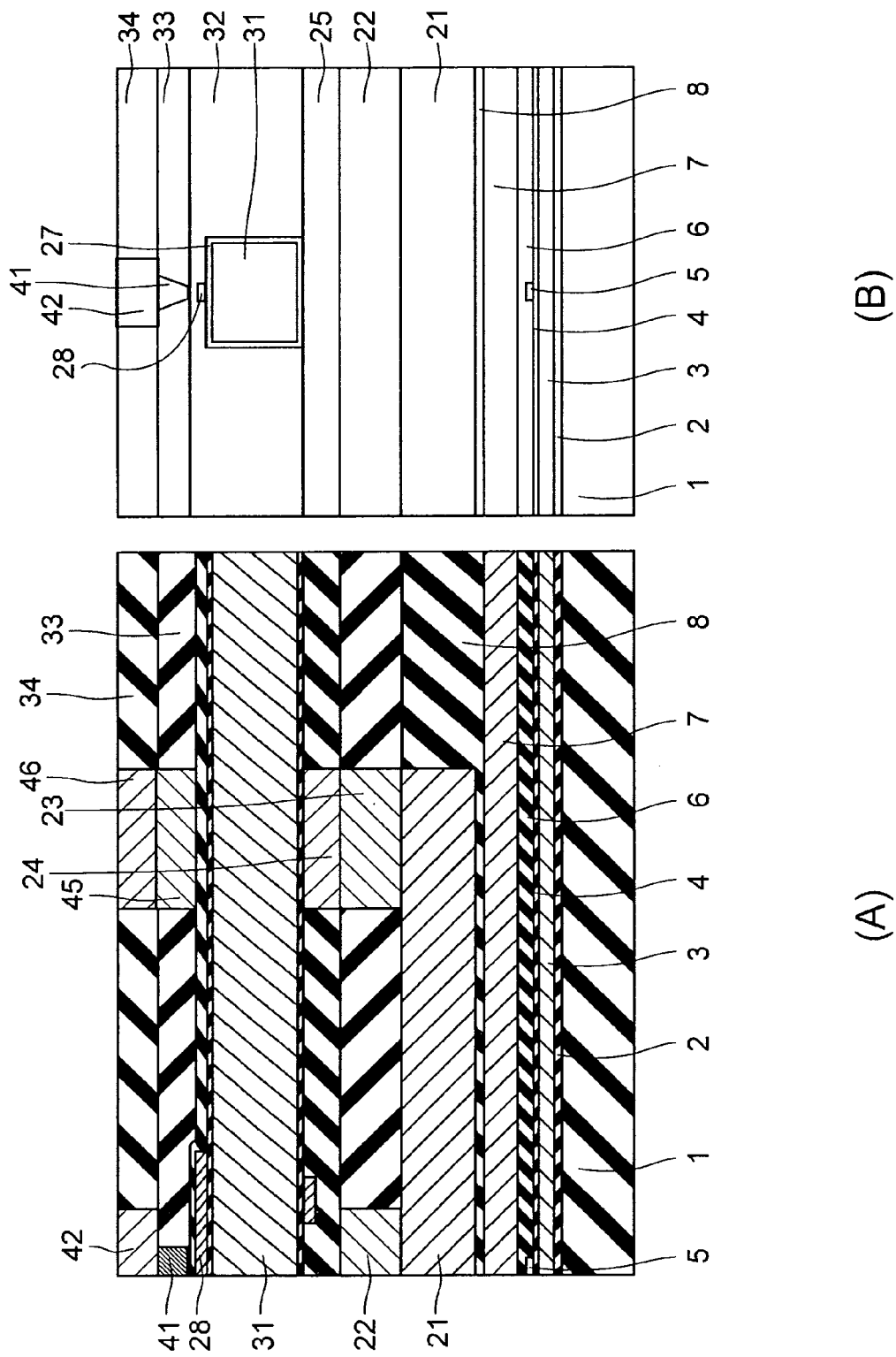
FIG. 15 is a view illustrating a process subsequent to that in FIG. 14, in which (A) is a sectional view corresponding to FIG. 1, (B) is a front view corresponding to FIG. 2.
Figure 16:
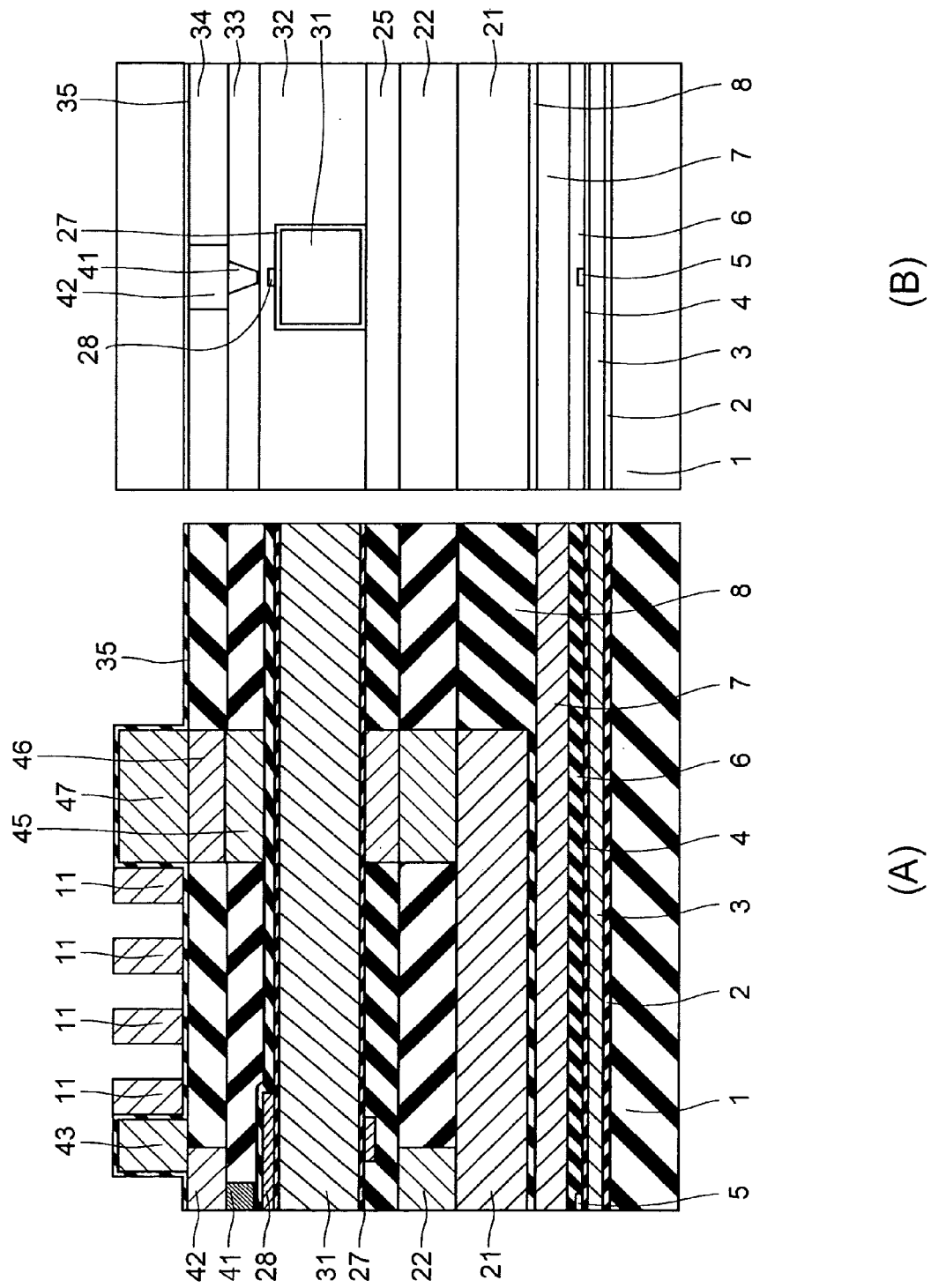
FIG. 16 is a view illustrating a process subsequent to that in FIG. 15, in which (A) is a sectional view corresponding to FIG. 1, (B) is a front view corresponding to FIG. 2.
Figure 18:
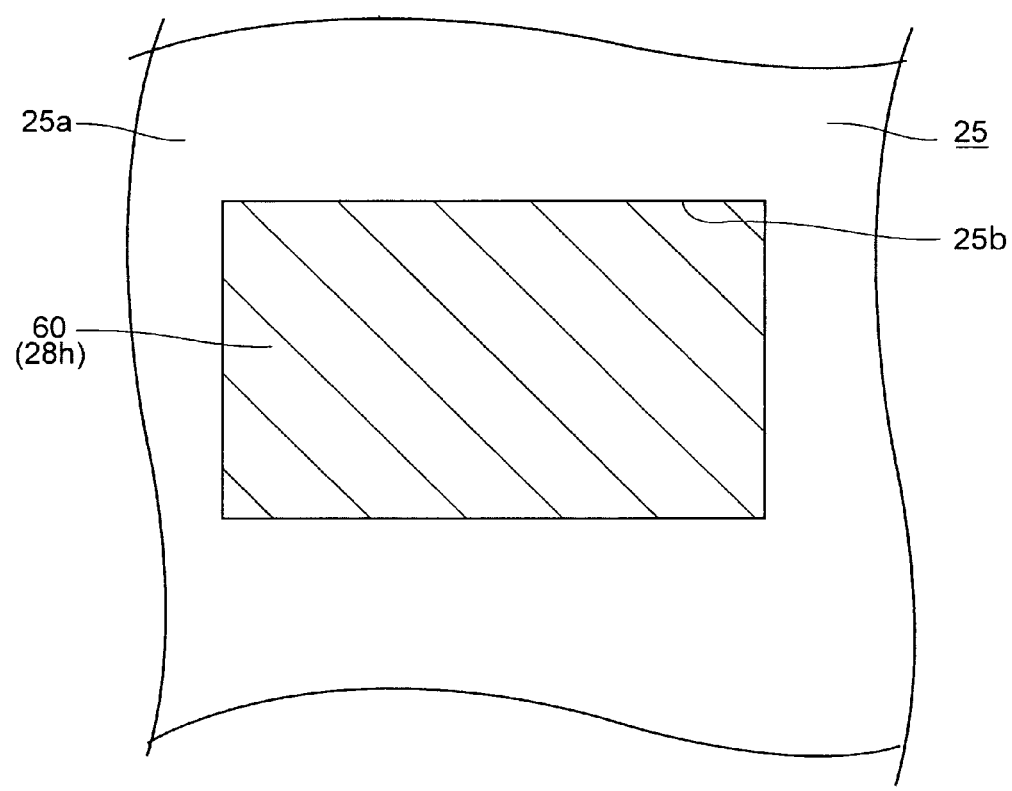
FIG. 18 is a plan view illustrating a principal part of a surface of laminated body when a rectangular depression is formed.

The base insulating layer 25 has an end face 25c arranged within the ABS 101, as illustrated in FIG. 2. The base insulating layer 25 is formed on the surface of the front magnetic pole layer 22 and an insulating layer 26. A rectangular depression 25b is formed on a surface 25a of a side distant from the substrate 1 (referred also to as an upper side that is a side closer to the main magnetic pole layer 40, in the embodiment) in the base insulating layer 25 (see FIG. 12, FIG. 18, in detail).

The rectangular depression 25b is formed at a position distant from the ABS 101. The rectangular depression 25b is a part recessed, from the surface 25a, in a rectangular shape in a plan view by a very small depth. Inside the depression 25b, a later-described bottom base part 28h of the near-field light generating layer 28 is formed in an embedded state. The surface of the bottom base part 28h and the surface 25a form a flat surface without level difference between them.

The interposed layer 27 is in direct contact with the outer surface of the optical waveguide 31 and surround almost all of the outer surface of the optical waveguide 31 except a waveguide end face 31e.

The interposed layer 27 is formed using a dielectric substance having a lower refractive index than that of the optical waveguide 31, and for example, using alumina ($Al_2O_3$). The interposed layer 27 has a thickness of, for example, about 10 nm to about 70 nm, which is much smaller than those of the main magnetic pole layer 40 and the optical waveguide 31, and is thus referred also to as a very-thin interposed layer.

The interposed layer 27 has an upper face part 27a, a bottom face part 27b and side face parts 27c, 27d, as illustrated in FIG. 3 to FIG. 5. The upper face part 27a is in direct contact with the upper end face 31a of the optical waveguide 31. The bottom face part 27b is in direct contact with the lower end face 31b of the optical waveguide 31. The side face parts 27c, 27d are in direct contact with the side end faces 31c, 31d of the optical waveguide 31.

The near-field light generating layer 28 has, as illustrated in FIG. 3 to FIG. 8, the near-field light generating part 28a and the expanded part 28b. The near-field light generating layer 28 is formed to surround a later-described reduced thickness part 31g of the optical waveguide 31.

The near-field light generating layer 28 is made of metal and formed of, for example, one of Au, Ag, Ru, Al, Cu, Pd, Pt, Rh, Ir, W or an alloy made of a plurality of those elements.

The surrounding space of the near-field light generating layer 28 is filled with a surrounding dielectric substance layer 32. The surrounding dielectric substance layer 32 is formed using a dielectric substance such as alumina or the like. However, illustration of the surrounding dielectric substance layer 32 is omitted in FIG. 3, The near-field light generating part 28a is formed above a later-described upper end face 31a of the optical waveguide 31 via the upper face part 27a of the interposed layer 27. The near-field light generating part 28a has a generating end part 28d. The width (breadth) of the near-field light generating part 28a in a direction along the ABS 101 gradually increases as it becomes more distant from the generating end part 28d. The near-field light generating part 28a is formed in an almost isosceles triangle having equal sides intersecting each other at the generating end part 28d and having a largest breadth Wa (see FIG. 8). Further, the upper face 28c of the near-field light generating part 28a tilts, neat the ABS 101, in a downward direction approaching the substrate 1.

The generating end part 28d is arranged within the ABS 101. The generating end part 28d generates near-field light for heating the magnetic recording medium.

The expanded part 28b is connected with the near-field light generating part 28a, at a position more distant from the ABS 101 than is the near-field light generating part 28a. The expanded part 28b is formed on the outer surface of the interposed layer 27 including the upper face part 27a, the side face parts 27c, 27d, and the bottom face part 27b.

The expanded part 28b has a base part 28e, extended base parts 28f, 28g, and the bottom base part 28h. The expanded part 28b has a ring-like structure formed such that the base part 28e, the extended base parts 28f, 28g, and the bottom base part 28h are connected in one body to extend in one turn around the outer surface of the interposed layer 27 as illustrated in detail in FIG. 6, FIG. 7. In other words, the expanded part 28b has the ring-like structure formed to surround the interposed layer 27 and the optical waveguide 31 inside of it by starting at the upper face part 27a of the interposed layer 27, passing by the side face part 27c, the bottom face part 27b, and the side face part 27d, and returning to the upper face part 27a.

The base part 28e is formed above the upper end face 31a via the upper face part 27a of the interposed layer 27. The base part 28e is connected with an end part of the near-field light generating part 28a distant from the ABS 101 and having the largest breadth. The base part 28e is formed to have a breadth larger than that of the near-field light generating part 28a and is formed in an almost rectangular shape. The base part 28e has a large width structure in which its breadth Wb is larger than the breadth Wa of the near-field light generating part 28a as illustrated in FIG. 8 (Wb>Wa).

The extended base parts 28f, 28g are connected with both end parts of the base part 28e and both end parts of the bottom base part 28h. The extended base parts 28f, 28g are formed above later-described side faces 31c, 31d of the optical waveguide 31 via the side face parts 27c, 27d of the interposed layer 27, respectively. The extended base parts 28f, 28g have an opposing arrangement structure in which they are arranged to be oppose to each other with the optical waveguide 31 and the interposed layer 27 intervening between them.

The extended base parts 28f, 28g are formed in a direction perpendicular to the width direction of the base part 28e. Further, the extended base parts 28f, 28g are formed in a rectangular shape having the same size. The clearance between the extended base part 28f and the extended base part 28g corresponds to the sum of the breadth of the optical waveguide 31, the thickness of the side face part 27c, and the thickness of the side face part 27d.

The bottom base part 28h is connected with the extended base parts 28f, 28g. The bottom base part 28h is formed along the later-described lower end face 31b of the optical waveguide 31 via the bottom face part 27b of the interposed layer 27. Further, the bottom base part 28h is arranged to be opposed to the base part 28e with the optical waveguide 31 and the interposed layer 27 intervening between them.

The bottom base part 28h is formed to have a breadth larger than the that of the near-field light generating part 28a, similarly to the base part 28e, and formed in an almost rectangular shape. Further, the clearance between the bottom base part 28h and the base part 28e corresponds to the sum of the thickness of the optical waveguide 31, the thickness of the upper face part 27a, and the thickness of the bottom face part 27b.

The optical waveguide 31 has, as illustrated in FIG. 3, the waveguide end face 31e arranged within the ABS 101. Further, the optical waveguide 31 is formed such that a rod-shaped part 31f, the reduced thickness part 31g, and a connecting part 31h are integrated in one body as illustrated in detail in FIG. 42, and extends from the ABS 101 in a direction perpendicular to the ABS 101 (referred also to as a depth direction). Further, the optical waveguide 31 is formed to approach from the rear side to the ABS 101 passing through (penetrating) the linking magnetic pole layer 48.

An optical fiber 208 is connected to the optical waveguide 31, as illustrated in FIG. 46. Laser light generated by a semiconductor laser 207 are inputted to the optical waveguide 31 via the optical fiber 208. The optical waveguide 31 is formed using a dielectric substance which transmits laser light, such as $Ta_2O_5$ or the like and has a thickness of about 0.4 μm to about 1.5 μm. Note that the semiconductor laser 207 and the optical fiber 208 are illustrated in FIG. 46 (both of them will be described later in detail).

The optical waveguide 31 has the upper end face 31a on side closer to the main magnetic pole layer 40 (side distant from the substrate 1), the lower end face 31b on side distance from the main magnetic pole layer 40 (side closer to the substrate 1) and side faces 31c, 31d. The side faces 31c, 31d are connected with both sides of the upper end face 31a in the width direction, the lower end face 31b is connected with other sides of the side faces 31c, 31d, as illustrated in FIG. 3. Further, the upper end face 31a opposes the lower end face 31b, the side face 31c opposes the side face 31d.

Figure 42:
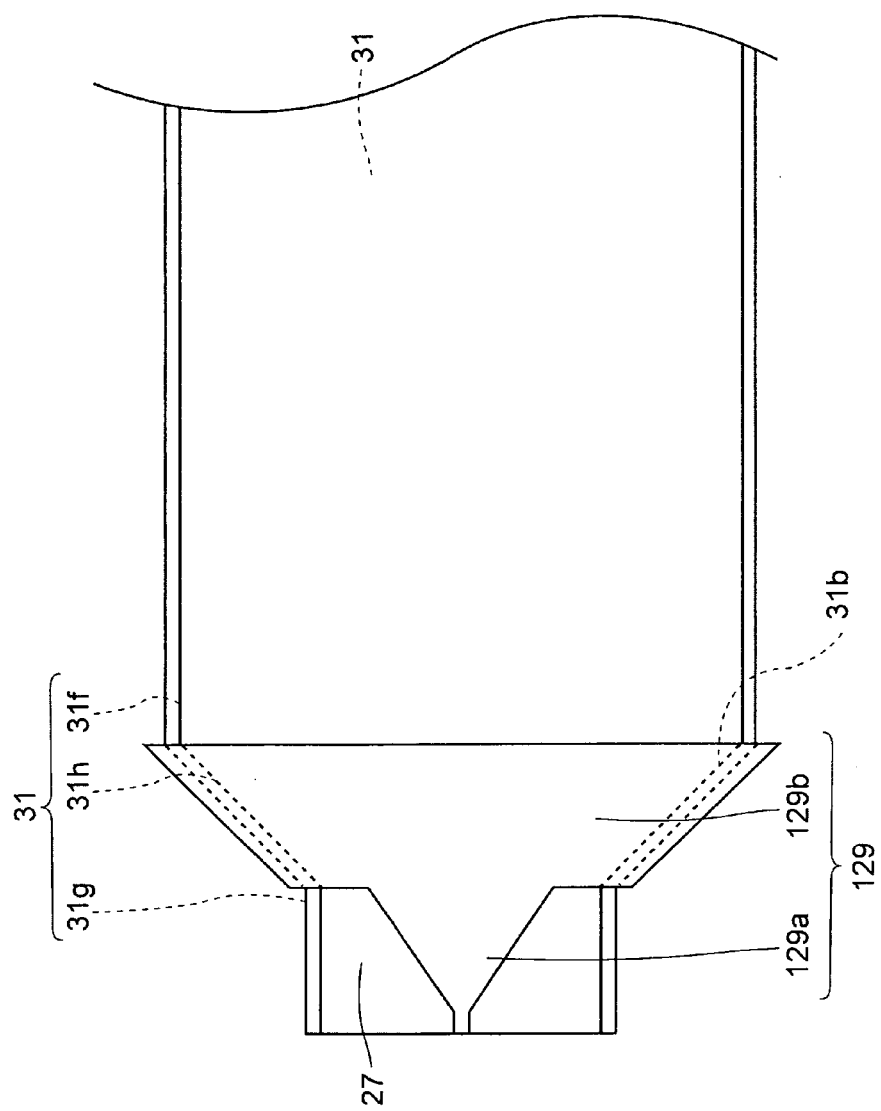
FIG. 42 is a plan view illustrating an interposed layer, a near-field light generating layer and an optical waveguide according to an another modified example.

Then, as illustrated in detail in FIG. 42, the rod-shaped part 31f is arranged at a position distant from the ABS 101 and formed in a rectangular parallelepiped shape extending along the depth direction. The reduced thickness part 31g is formed in a rectangular parallelepiped shape with a thickness smaller than that of the rod-shaped part 31f and a depth from the ABS 101 smaller than that of the rod-shaped part 31f. Further, the reduced thickness part 31g has the waveguide end face 31e. The connecting part 31h is a part connecting the rod-shaped part 31f to the reduced thickness part 31g while reducing in diameter.

Next, the main magnetic pole layer 40 will be explained with reference to FIG. 1 and FIG. 2. The main magnetic pole layer 40 has a magnetic pole end part layer 41, a connecting magnetic layer 42, a and a yoke magnetic pole layer 44.

The magnetic pole end part layer 41 has a magnetic pole end face 41a arranged within the ABS 101, as illustrated in FIG. 2. The magnetic pole end face 41a is formed in a manner to be opposed to the generating end part 28d of the near-field light generating part 28a via the surrounding dielectric substance layer 32, within the ABS 101.

Further, the magnetic pole end part layer 41 and the connecting magnetic layer 42 have a symmetrical structure in width direction formed to be bilaterally symmetrical about part thereof opposed to the generating end part 28d. The magnetic pole end part layer 41 is arranged on the upper side (side distant from the substrate 1) of the near-field light generating part 28a.

Further, the magnetic pole end part layer 41 is arranged closer to the ABS 101 than is the thin-film coil 10.

The connecting magnetic layer 42 has a magnetic pole end face arranged within the ABS 101. The connecting magnetic layer 42 is junctioned to the magnetic pole end part layer 41 and the front magnetic layer 43. The connecting magnetic layer 42 has a depth larger than that of the magnetic pole end part layer 41. The connecting magnetic layer 42 is also arranged on a side closer to the ABS 101 than is the thin-film coil 10.

The front magnetic layer 43 is arranged on a side closer to the ABS 101 than is the thin-film coil 10. However, the front magnetic layer 43 stands back from the ABS 101, and is disposed at a position distant from the ABS 101. The front magnetic layer 43 is junctioned to the connecting magnetic layer 42 and the yoke magnetic pole layer 44. An upper end face (face of the side distant from the substrate 1) of the front magnetic layer 43 and an upper end face of the thin-film coil 10 are formed flat without level difference The yoke magnetic pole layer 44 stands back from the ABS 101. The yoke magnetic pole layer 44 is junctioned to the front magnetic layer 43 and a later-described upper magnetic pole layer 47 of the linking magnetic pole layer 48. The yoke magnetic pole layer 44 extends in a depth direction, and leads to the linking magnetic pole layer 48 straddling to the thin-film coil 10. An upper end face of the yoke magnetic pole layer 44 (face of the side distant from the substrate 1) is formed flat.

Next, the linking magnetic pole layer 48 will be explained. The linking magnetic pole layer 48 has a structure that a lower magnetic pole layer 45, a middle magnetic pole layer 46 and the upper magnetic pole layer 47 are junctioned together, as illustrated in FIG. 1.

The linking magnetic pole layer 48 is arranged in a manner to hold the optical waveguide 31 and the interposed layer 27 from both right and left sides at a position more distant from the ABS 101 than are the four turn parts 11 of the thin-film coil 10. The linking magnetic pole layer 48 is contact with the side face parts 27c, 27d of the interposed layer 27.

The lower magnetic pole layer 45 is junctioned to the second rear magnetic pole layer 24 and the middle magnetic pole layer 46. The middle magnetic pole layer 46 is junctioned to the lower magnetic pole layer 45 and the upper magnetic pole layer 47. The upper magnetic pole layer 47 is junctioned to the middle magnetic pole layer 46 and the yoke magnetic pole layer 44.

The linking magnetic pole layer 48 magnetically links the return magnetic pole layer 20 to the main magnetic pole layer 40, and has a role of returning, to the main magnetic pole layer 40, the magnetic flux flown back to the return magnetic pole layer 20.

(Operation Contents of Thermally Assisted Magnetic Head)

Subsequently, the magnetic recording operation of the thermally assisted magnetic head having the above structure will be described as follows.

When a current modulated according to data to be recorded on the magnetic recording medium is caused to flow through the thin-film coil 10, the current generates a recording magnetic field. The recording magnetic field passes through the main magnetic pole layer 40, and a magnetic flux caused by the recording magnetic field is emitted from the magnetic pole end face 41*a* to the magnetic recording medium. With this magnetic flux, the data is recorded on the magnetic recording medium.

On the other hand, when the semiconductor laser 207 generates laser light, the laser light are transmitted to the optical waveguide 31 via the optical fiber 208. The laser light move through the optical waveguide 31 to the ABS 101. Since the interposed layer 27 is formed so as to cover with the outer face of the optical waveguide 31, and the near-field light generating part 28*a* is formed outside of the interposed layer 27, the laser light is applied to the near-field light generating part 28*a* via the interposed layer 27.

Further, the interposed layer 27 having a lower refractive index than that of optical waveguide 31 is in contact with the optical waveguide 31. Therefore, when laser light enter the interposed layer 27 having lower refractive index from the optical waveguide 31 having higher refractive index and are totally reflected, evanescent light seeps near the surface of the interposed layer 27 having a lower refractive index. The use of the evanescent light makes it possible to match the phase speed thereof with the phase speed of surface plasmons and excite surface plasmons at the near-field light generating part 28*a*.

The surface plasmons propagate to the generating end part 28*d* of the near-field light generating part 28*a*. The generating end part 28*d* is an end part of the near-field light generating part 28*a*, and the near-field light generating part 28*a* is formed approximately in the isosceles triangle that equal sides of the near-field light generating part 28*a* intersect at the generating end part 28*d*. Therefore, the surface plasmons are concentrated on the generating end part 28*d*. Then, a near-field light having a very high electric field intensity is generated near the generating end part 28*d*.

The near-field light is applied from the generating end part 28*d* to the magnetic recording medium and reaches the surface of the magnetic recording medium. Then, a limited extremely small region in the magnetic recording layer of the magnetic recording medium is intensively heated by the near-field light. In the magnetic recording layer, the coercive force reduces to an extent at which data can be recorded by the magnetic flux caused by the recording magnetic field.

In the thermally assisted magnetic head 100, the coercive force can be reduced in the above-descried manner, so that data can be recorded also on a magnetic recording medium having a high coercive force for high-density recording.

(Operation and Effect of Thin-Film Magnetic Head 300)

However, in the thermally assisted magnetic head 100, the temperature of the near-field light generating layer 28 significantly increases accompanying generation of near-field light in the near-field light generating layer 28. The near-field light generating layer 28 is made of metal such as gold, silver, aluminum, palladium or the like and thus causes self expansion due to its own heat generation. Then, the near-field light generating layer 28 projects from the ABS 101 to the magnetic recording medium.

The thermally assisted magnetic head 100 is incorporated in a later-described slider 230, and the slider 230 floats from the magnetic recording medium 202 by a minute distance. If the near-field light generating layer 28 projects from the ABS 101, the thermally assisted magnetic head 100 is likely to collide with the magnetic recording medium 202, thereby causing the hard disk drive to fail.

In addition, when the temperature of the near-field light generating layer 28 significantly increases accompanying the generation of the near-field light, there occurs a possibility of melting and deformation of the near-field light generating layer 28, in particular, the generating end part 28*d*. If the shape of the near-field light generating part 28*a* deforms, it becomes difficult to intensively heat a very small recording region of the magnetic recording medium.

Further, since the main magnetic pole layer 40 is arranged very near the near-field light generating layer 28 in the thermally assisted magnetic head 100, the heat generated by the near-field light generating layer 28 is easily conducted to the main magnetic pole layer 40. Then, the heat possibly deforms or chips a part of the main magnetic pole layer 40 on the ABS 101 side.

However, in the thermally assisted magnetic head 100, the near-field light generating layer 28 has the expanded part 28*b* in addition to the near-field light generating part 28*a* both of which are integrated in one body, and can therefore provide the following operation and effect and solve the above problems.

First of all, the expanded part 28*b* is connected with the near-field light generating part 28*a*, so that the heat generated by the near-field light generating part 28*a* is conducted to the expanded part 28*b*. In addition, since the expanded part 28*b* is connected with the near-field light generating part 28*a* at a position more distant from the ABS 101 than is the near-field light generating part 28*a*, the heat generated by the near-field light generating part 28*a* can be led by the expanded part 28*b* to a place distant from the generating end part 28*d* that is the heat generation source.

Further, the expanded part 28*b* has the base part 28*e* and the extended base parts 28*f*, 28*g* and therefore has a part largely distant from the near-field light generating part 28*a*.

Therefore, the expanded part 28*b* can exhibit the function as a heat radiating layer (heat sink) that leads the heat generated by the near-field light generating part 28*a* to the place distant from the generating end part 28*d* that is the heat generation source and radiates the heat to the outside of the near-field light generating part 28*a*.

In short, the near-field light generating layer 28 has both the function of generating the near-field light and the heat radiating function of radiating the generated heat accompanying the generation of the near-field light to the outside.

Therefore, even if the near-field light generating part 28*a* generates high heat accompanying the generation of the near-field light, the heat is led by the expanded part 28*b* to the place distant from the generating end part 28*d* and radiated to the outside of the near-field light generating part 28*a*. Therefore, an increase in temperature of the near-field light generating layer 28 can be suppressed. Accordingly, the self-inflation of the near-field light generating layer 28 can be suppressed.

This eliminates the situation in which the generating end part 28*d* melts and deforms, and therefore enables prevention of melting and deformation of the near-field light generating part 28*a*. Thus, the generating end part 28*d* can intensively heat the very small recording region of the magnetic recording medium.

Further, in the thermally assisted magnetic head 100, the main magnetic pole layer 40 is arranged very near the near-field light generating layer 28, and the expanded part 28*b* exhibits the above-described heat radiating function to make the heat generated at the near-field light generating part 28a unlikely to reach the main magnetic pole layer 40. Therefore, chipping and deformation of the main magnetic pole layer 40 can be effectively prevented.

Further, the thermally assisted magnetic head 100 is able to prevent a situation that the near-field light generating layer 28 projects from the ABS 101, and thus is able to prevent failure of the hard disk drive.

Meanwhile, the expanded part 28b is connected with the near-field light generating part 28a and is formed using the same metal material as that of the near-field light generating part 28a. Therefore, the expanded part 28b can also excite the surface plasmons similarly to the near-field light generating part 28a. Therefore, the surface plasmons can be more efficiently excited, even with the same output of the laser light, as compared to the case where the near-field light generating part 28a exists by itself without including the expanded part 28b.

In order to intensify the near-field light generated by the generating end part 28d, it is desirable to increase the output of the semiconductor laser 207 emitting the laser light so as to apply the laser light as strong as possible to the near-field light generating layer 28.

However, this bring about a problem in which as the laser light becomes stronger, the heat generation amount of the near-field light generating layer 28 increases to promote the melting and deformation of the near-field light generating layer 28.

To solve the problem, it is desirable to intensify the near-field light without increasing the output of the semiconductor laser 207, and to this end, it is desirable to make it possible to more efficiently excite the surface plasmons without increasing the output of the semiconductor laser 207.

In this regard, in the thermally assisted magnetic head 100, the near-field light generating layer 28 has the near-field light generating part 28a and the expanded part 28b and thereby can efficiently excite the surface plasmons. Therefore, in the thermally assisted magnetic head 100, the increase in heat generation by the near-field light generating part 28a accompanying the increase in output of the semiconductor laser 207 is eliminated, and melting and deformation of the near-field light generating part 28a are not likely to occur.

Accordingly, in the thermally assisted magnetic head 100, melting and deformation of the near-field light generating part 28a can be more surely prevented, and chipping and deformation of the main magnetic pole layer 40 can be more surely prevented.

In particular, in the thermally assisted magnetic head 100, the bottom base part 28h is arranged to be opposed to the base part 28e with the optical waveguide 31 and the interposed layer 27 intervening between them, at the expanded part 28b. Therefore, when the bottom base part 28h is provided in addition to the extended base parts 28f, 28g as in the expanded part 28b, the heat radiating function of the near-field light generating layer 28 is further enhanced.

Further, also when the extended base parts 28f, 28g in the opposing arrangement structure are provided as in the expanded part 28b, a large place distant from the generating end part 28d is ensured, also in which case the heat radiating function of the near-field light generating layer 28 is further enhanced.

Moreover, the above-described expanded part 28b has the ring-like structure including the extended base parts 28f, 28g in the opposing arrangement structure and the bottom base part 28h, and therefore has also the heat radiating function due to provision of them respectively. Therefore, the expanded part 28b is further enhanced in heat radiating function.

(Method of Manufacturing Thermally Assisted Magnetic Head)

Figure 9:
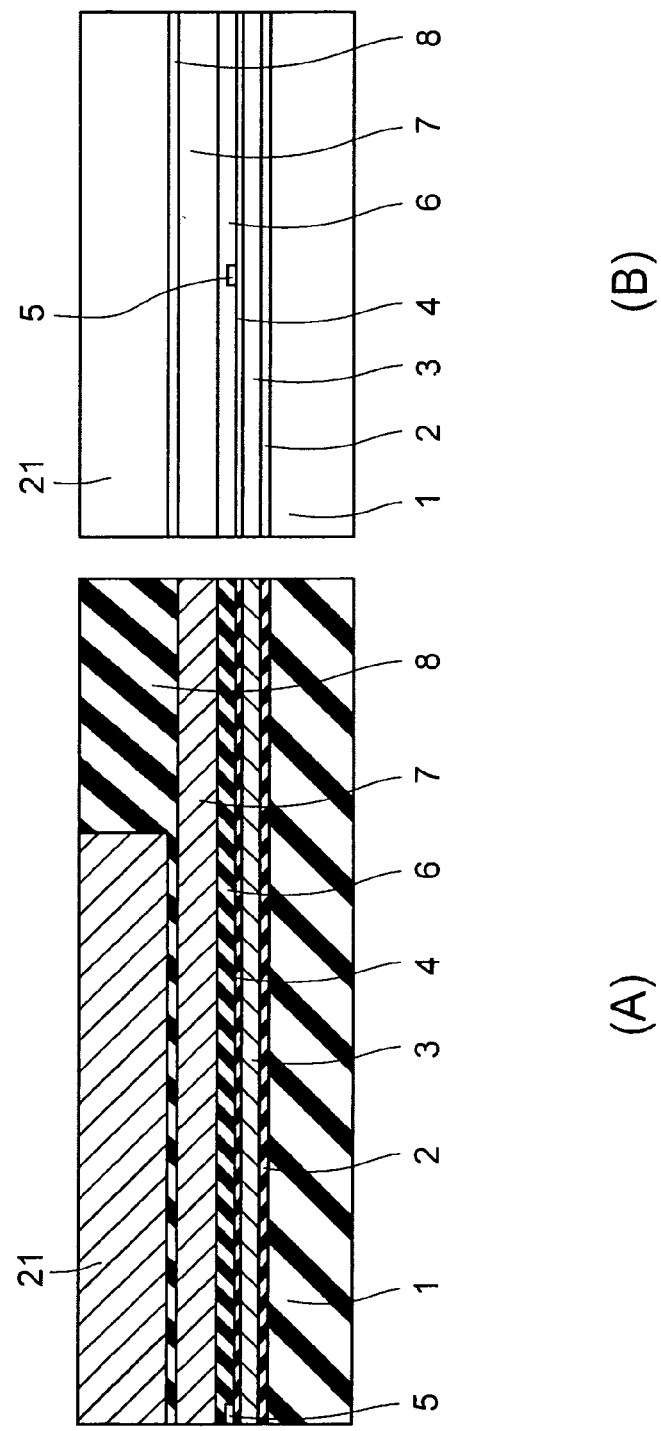
FIG. 9 is a view illustrating a process of manufacturing the thermally assisted magnetic head in accordance with an embodiment of the present invention, in which (A) is a sectional view corresponding to FIG. 1, (B) is a front view corresponding to FIG. 2.
Figure 10:
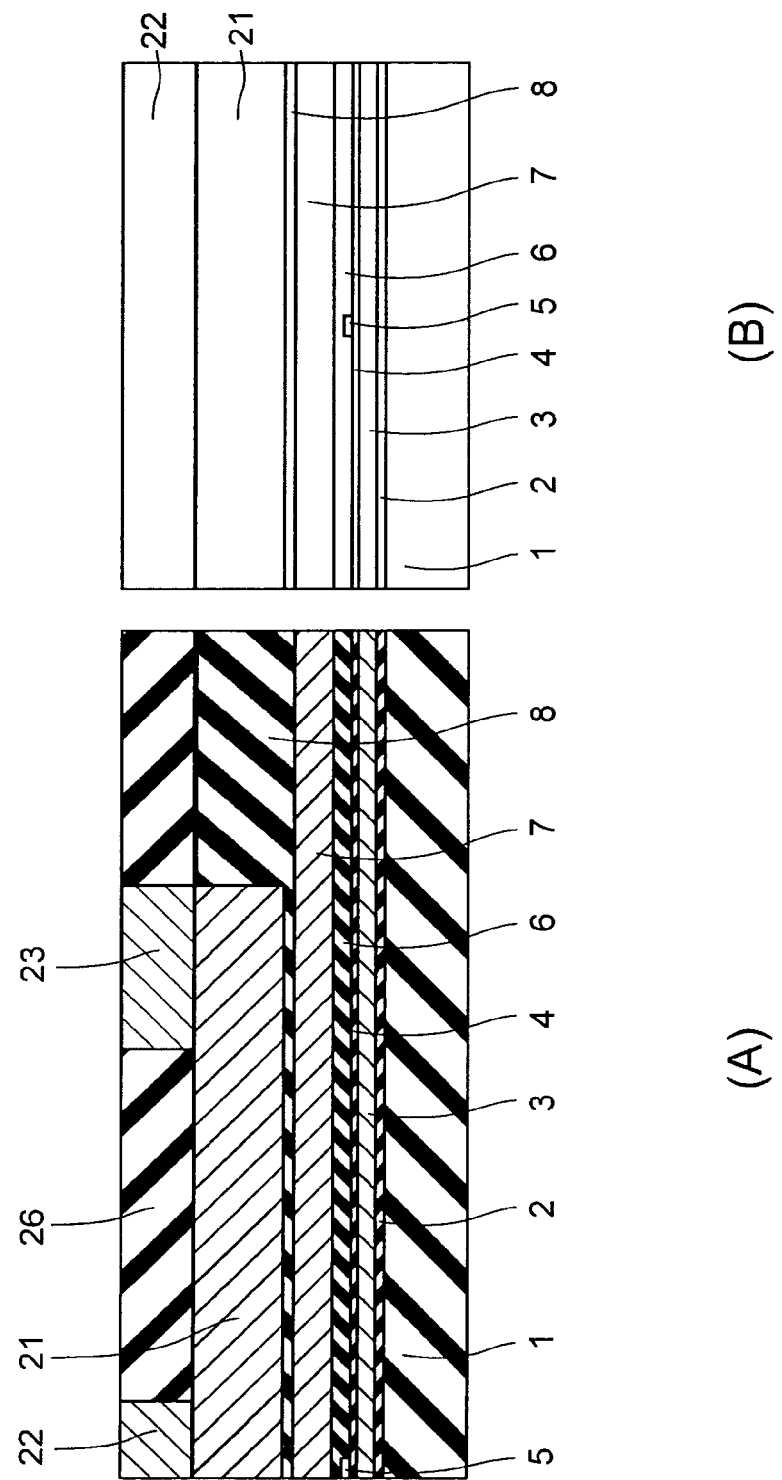
FIG. 10 is a view illustrating a process subsequent to that in FIG. 9, in which (A) is a sectional view corresponding to FIG. 1, (B) is a front view corresponding to FIG. 2.
Figure 11:
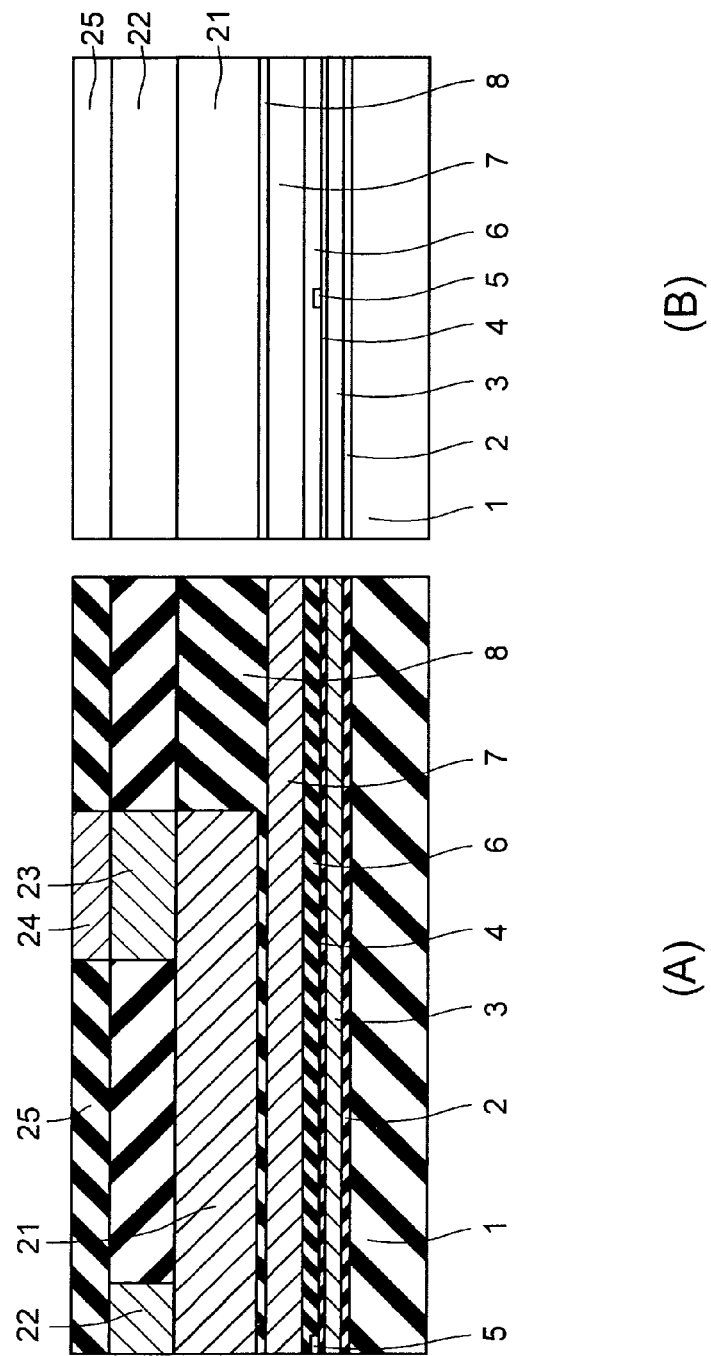
FIG. 11 is a view illustrating a process subsequent to that in FIG. 10, in which (A) is a sectional view corresponding to FIG. 1, (B) is a front view corresponding to FIG. 2.
Figure 17:
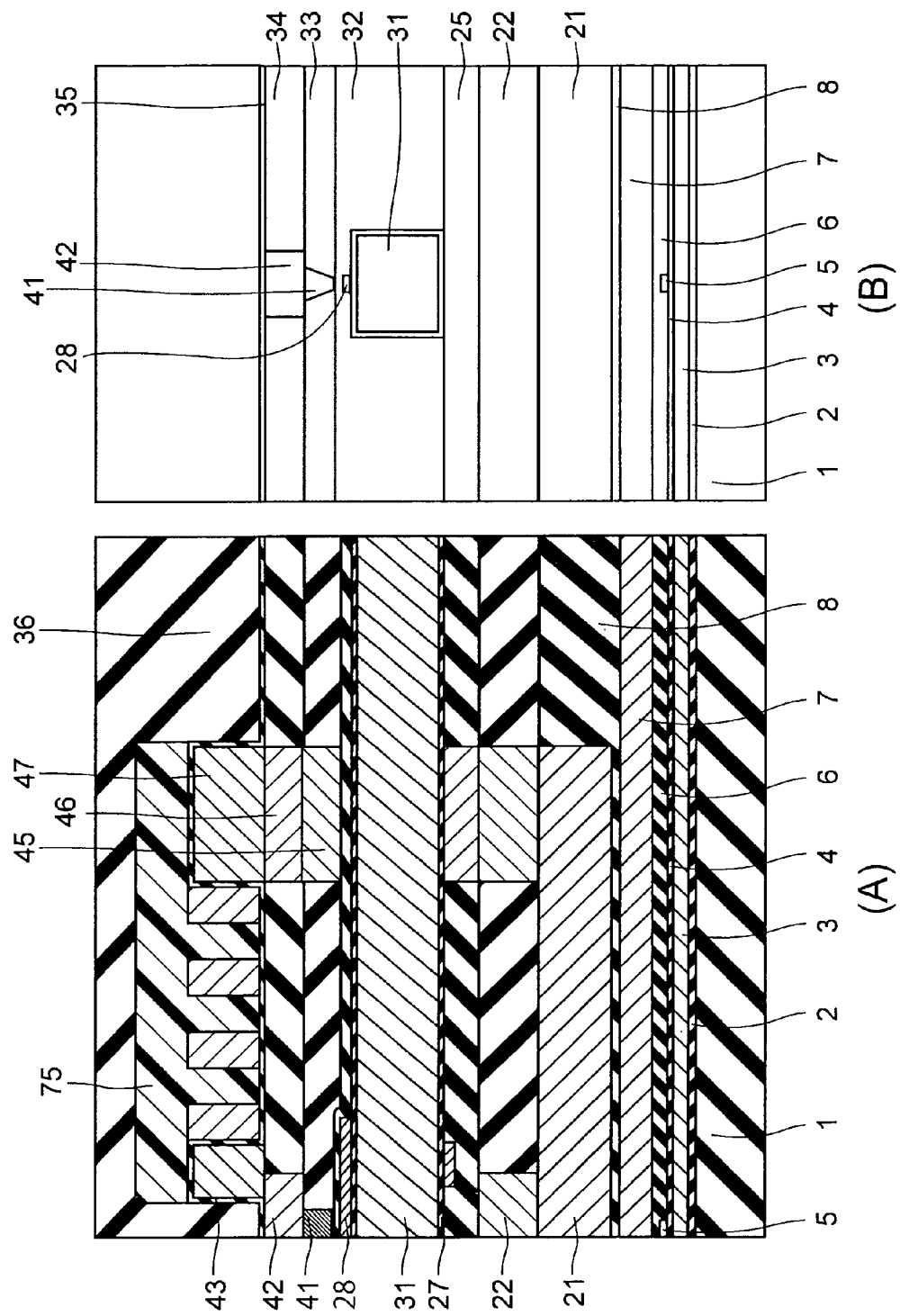
FIG. 17 is a view illustrating a process subsequent to that in FIG. 16, in which (A) is a sectional view corresponding to FIG. 1, (B) is a front view corresponding to FIG. 2.

Next, a method of manufacturing the thermally assisted magnetic head 100 having the structure mentioned above will now be explained with reference to FIG. 9 (A), (B) to FIG. 17 (A), (B) and FIG. 18 to FIG. 33 together with FIG. 1 and FIG. 2 mentioned above.

Here, FIG. 9(A) to FIG. 17(A) are sectional views corresponding to FIG. 1 in the processes of manufacturing the thermally assisted magnetic head 100, and FIG. 9(B) to FIG. 17(B) are front views corresponding to FIG. 2 in the processes of manufacturing the thermally assisted magnetic head 100. In each drawing, the left end face in (A) indicates a position (a planned opposing surface position) which will become the ABS 101 afterward. Further, FIG. 18 to FIG. 26 are plan views illustrating principal part of a surface of the laminated body in the respective processes of manufacturing. FIG. 27 to FIG. 33 are sectional views of FIG. 20 to FIG. 26, respectively.

First, the substrate 1 made of a ceramic material such as aluminum oxide-titanium carbide ($Al_2O_3.TiC$) is prepared. Subsequently, as shown in FIG. 9 (A), (B), the insulating layer 2 made of an insulating material such as alumina ($Al_2O_3$), the lower shield layer 3 made of a magnetic material and the lower shield gap film 4 are successively laminated on the substrate 1.

Next, the upper shield gap film 6 is formed by an insulating material such as to shield the MR device 5. Here, an undepicted lead connected to the MR device 5 is formed, and the MR device 5 and lead are covered with the upper shield gap film 6. Thereafter, using a magnetic material, the upper shield layer 7 is formed on the upper shield gap film 6.

Then, on the upper shield layer 7, the insulating layer 8 is formed using an insulating material such as alumina ($Al_2O_3$) or the like. Thereafter, a portion of the insulating layer 8 which is located on the planned opposing surface position side is removed, and the connecting magnetic pole layer 21 is formed using a magnetic material such as CoNiFe, CoFe, NiFe, CoFeN or the like.

Then, as illustrated in FIG. 10(A), (B), an insulating layer 26 is formed on the whole surface of the laminated body using an insulating material such as alumina ($Al_2O_3$) or the like, and portions of the insulating layer 26 where the front magnetic pole layer 22 will be formed and the first rear magnetic pole layer 23 will be formed are removed.

Then, the front magnetic pole layer 22 and the first rear magnetic pole layer 23 are formed at the open portions of the insulating layer 26 in the surface of the laminated body, for example, by the frame plating method.

Next, as illustrated in FIG. 11(A), (B), the base insulating layer 25 is formed on the surface of the laminated body using an insulating material such as alumina ($Al_2O_3$) or the like, and portion of the base insulating layer 25 where the second rear magnetic pole layer 24 will be formed is removed.

Then, the second rear magnetic pole layer 24 is formed at the open portions of the base insulating layer 25 in the surface of the laminated body, for example, by the frame plating method.

Subsequently, as illustrated in FIG. 12(A), (B), a photoresist is applied to the surface of the laminated body, and patterning is then performed using a predetermined photomask to form a photoresist layer 71. A part of the photoresist layer 71 where the rectangular depression 25b will be formed is removed, and a depression part is formed at the part. Thereafter, using the photoresist layer 71 as a mask, etching is performed to form the rectangular depression 25b on the surface of the base insulating layer 25.

Subsequently, an embedded metal layer forming step is performed. In this step, a deposition of a metal by physical vapor deposition is performed to form the embedded metal layer 60 in the rectangular depression 25b, as illustrated in FIG. 13(A), (B) and FIG. 18.

The deposition of a metal is performed on rectangular depression 25b. Further, sputtering, vacuum vapor deposition or the like is performing using, for example, one of Au, Ag, Ru, Al, Cu, Pd, Pt, Rh, Ir, W or an alloy made of a plurality of those elements. In this case, the deposition of a metal is performed such as to expose the rectangular depression 25b by the photoresist layer 71. An embedded metal layer 60 is a part which will become the bottom base part 28h afterward. A part with hatching shows the embedded metal layer 60, in FIG. 18.

Figure 19:
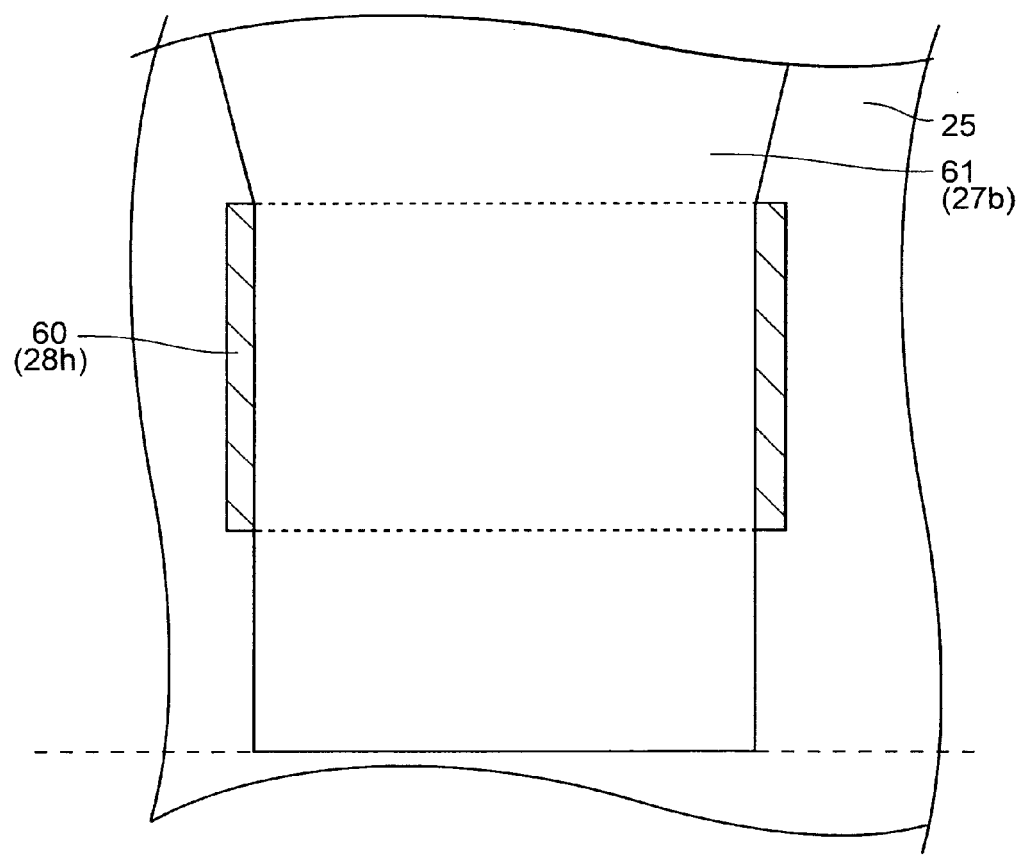
FIG. 19 is a plan view illustrating a principal part of a surface of laminated body in a process subsequent to that in FIG. 18.

Next, a first dielectric substance layer forming step is performed. In this step, a first dielectric substance layer 61 in a band shape extending in a depth direction from the planned opposing surface position (a part of broken line lower in FIG. 19), and having thin thickness is formed, on the surface of the laminated body, as illustrated in FIG. 19. The first dielectric substance layer 61 is formed to cover the part of the embedded metal layer 60 except both end parts along the ABS 101 (a part with hatching in FIG. 19). The first dielectric substance layer 61 is formed by the atomic layer deposition using a dielectric substance such as alumina or the like. This first dielectric substance layer 61 will become the bottom face part 27b afterward.

Figure 20:
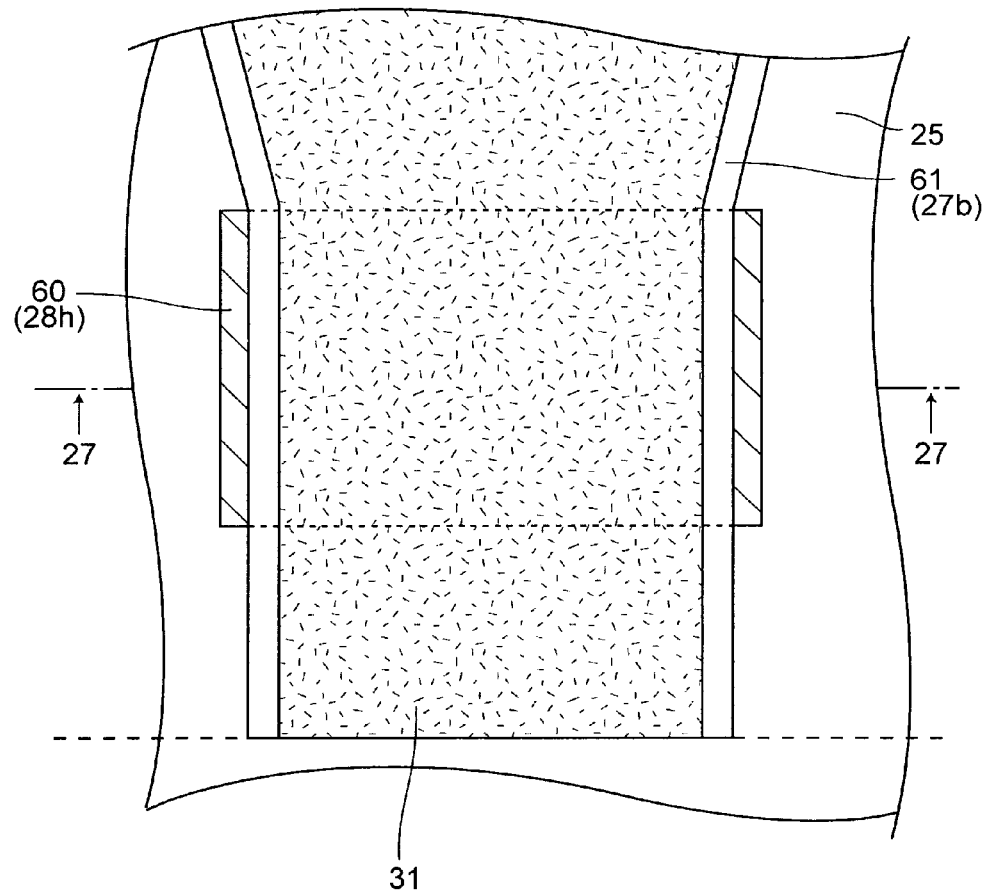
FIG. 20 is a plan view illustrating a principal part of a surface of laminated body in a process subsequent to that in FIG. 19.
Figure 27:
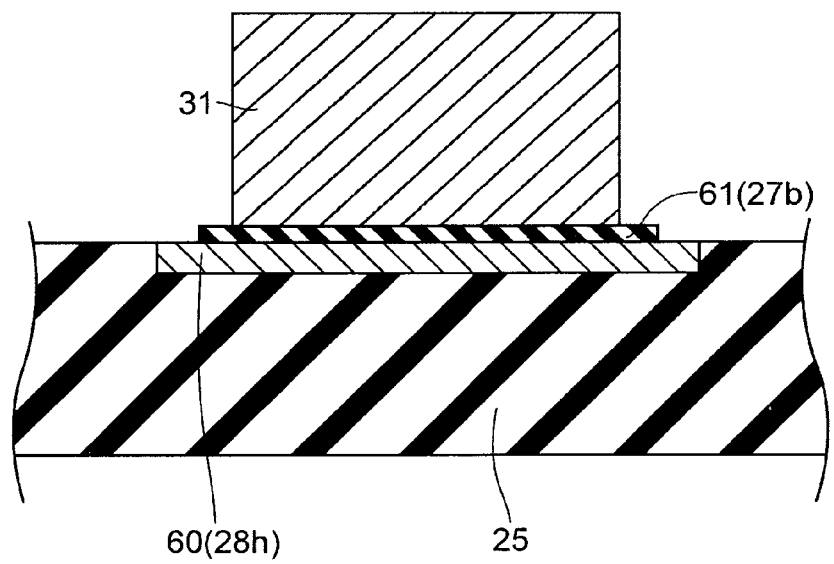
FIG. 27 is a sectional view taken along the line 27-27 in FIG. 20.

Then, an optical waveguide forming step is performed. In this step, the optical waveguide 31 is formed, as illustrated in FIG. 20, FIG. 27. The optical waveguide 31 is formed using a dielectric substance such as $Ta_2O_5$ or the like transmitting the laser light. A part with dots in FIG. 20 shows the optical waveguide 31.

The optical waveguide 31 is formed in a structure having the rod-shaped part 31f, the reduced thickness part 31g, and the connecting part 31h which are integrated in one body as described above. Further, the optical waveguide 31 is formed to cover the part of the first dielectric substance layer 61 except both side parts along the ABS 101. Since the shape of the reduced thickness part 31g is the rectangular parallelepiped shape, the optical waveguide 31 is formed to have a rectangular parallelepiped-shape part on the ABS 101 side.

Figure 21:
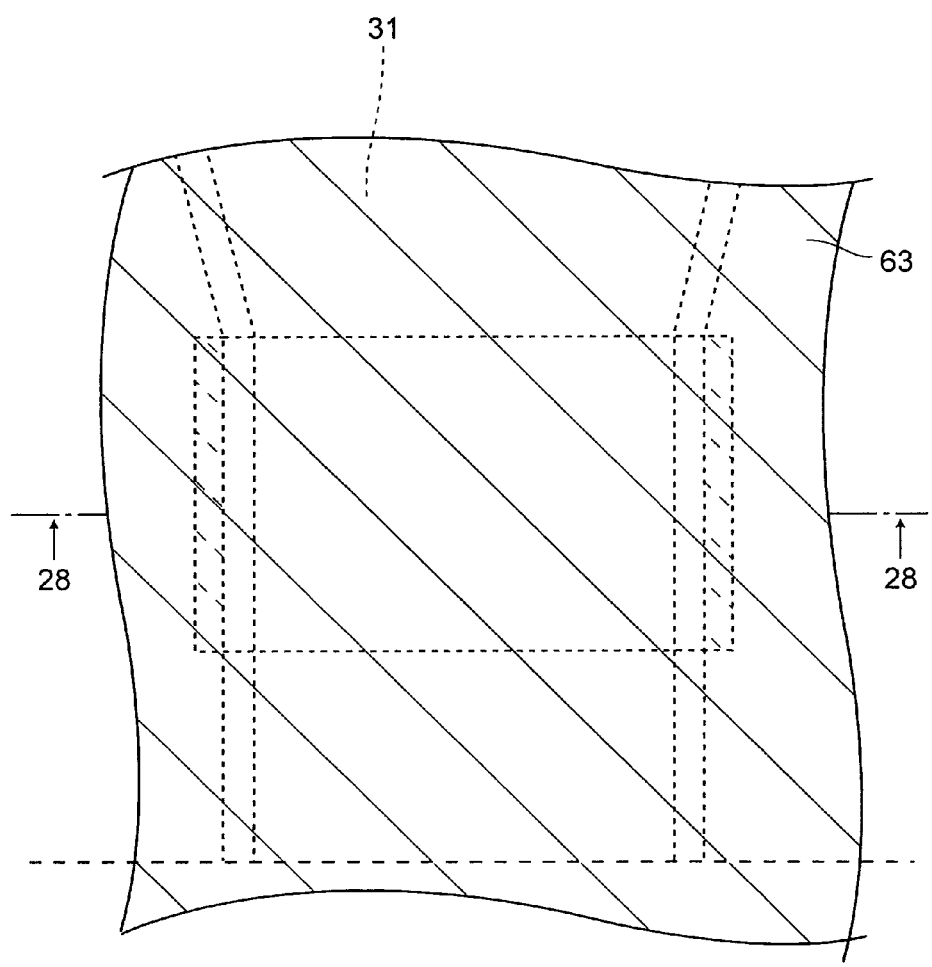
FIG. 21 is a plan view illustrating a principal part of a surface of laminated body in a process subsequent to that in FIG. 20.
Figure 22:
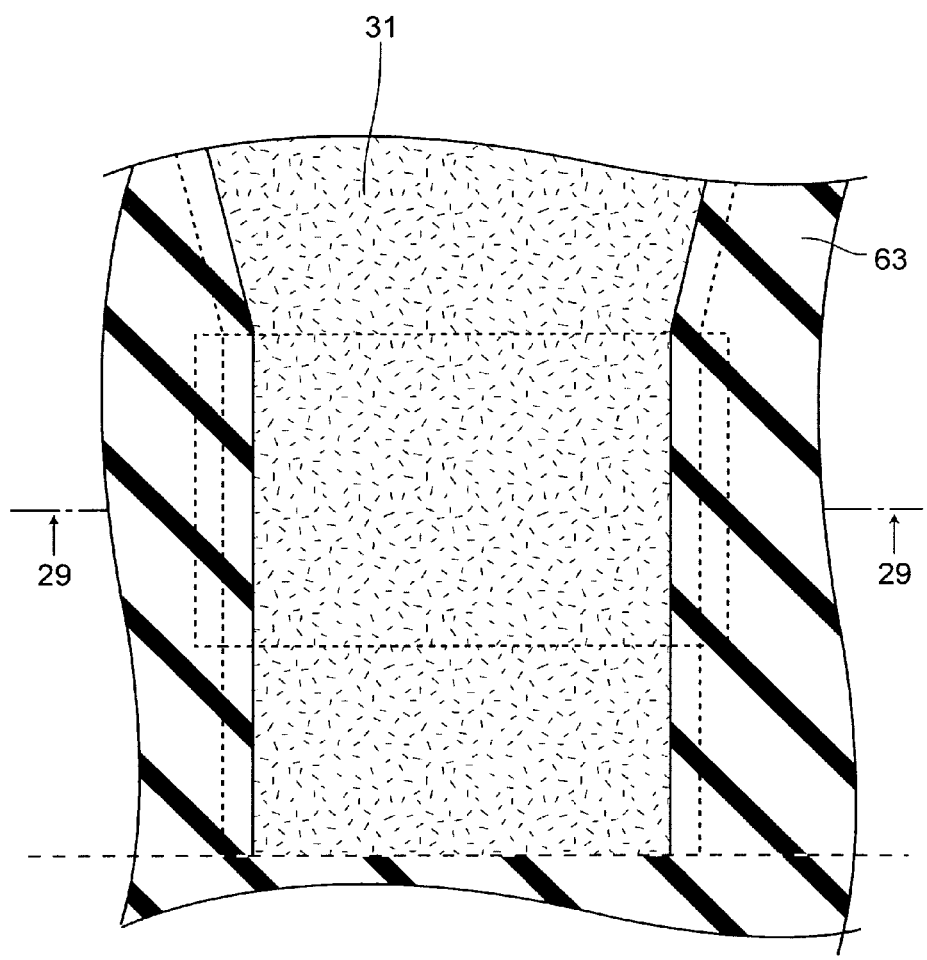
FIG. 22 is a plan view illustrating a principal part of a surface of laminated body in a process subsequent to that in FIG. 21.
Figure 28:
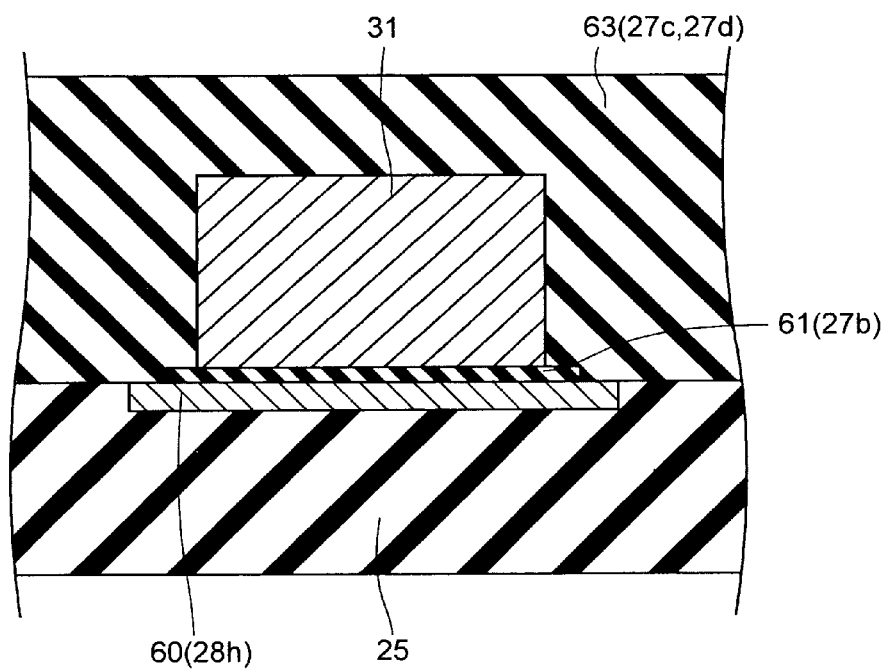
FIG. 28 is a sectional view taken along the line 28-28 in FIG. 21.

Next, a second dielectric substance layer forming step is performed. In this step, a second dielectric substance layer 63 is formed on the surface of the laminated body, using a dielectric substance such as alumina or the like, as illustrated in FIG. 21, FIG. 28. Note that a hatching different from FIG. 22 is given to the second dielectric substance layer 63, in FIG. 21, for convenience of illustration.

Figure 29:
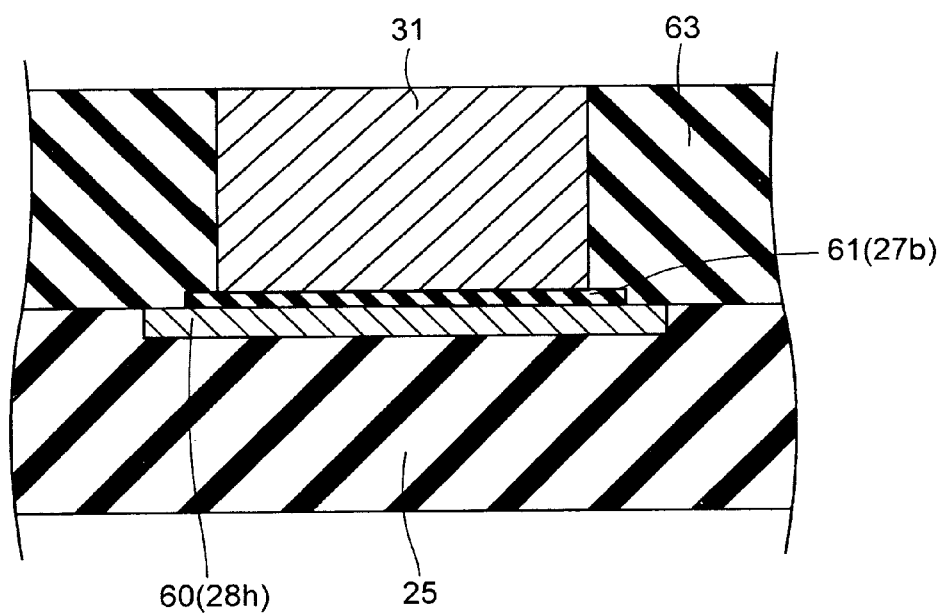
FIG. 29 is a sectional view taken along the line 29-29 in FIG. 22.

Subsequently, a flattening step is performed. In this step, the surface of the laminated body is polished by chemical mechanical polishing (hereinafter, referred to as "CMP") until a surface of the optical waveguide 31 emerges, so as to be made flat, as illustrated in FIG. 22, FIG. 29. A part with dots in FIG. 22 shows the optical waveguide 31.

Figure 23:
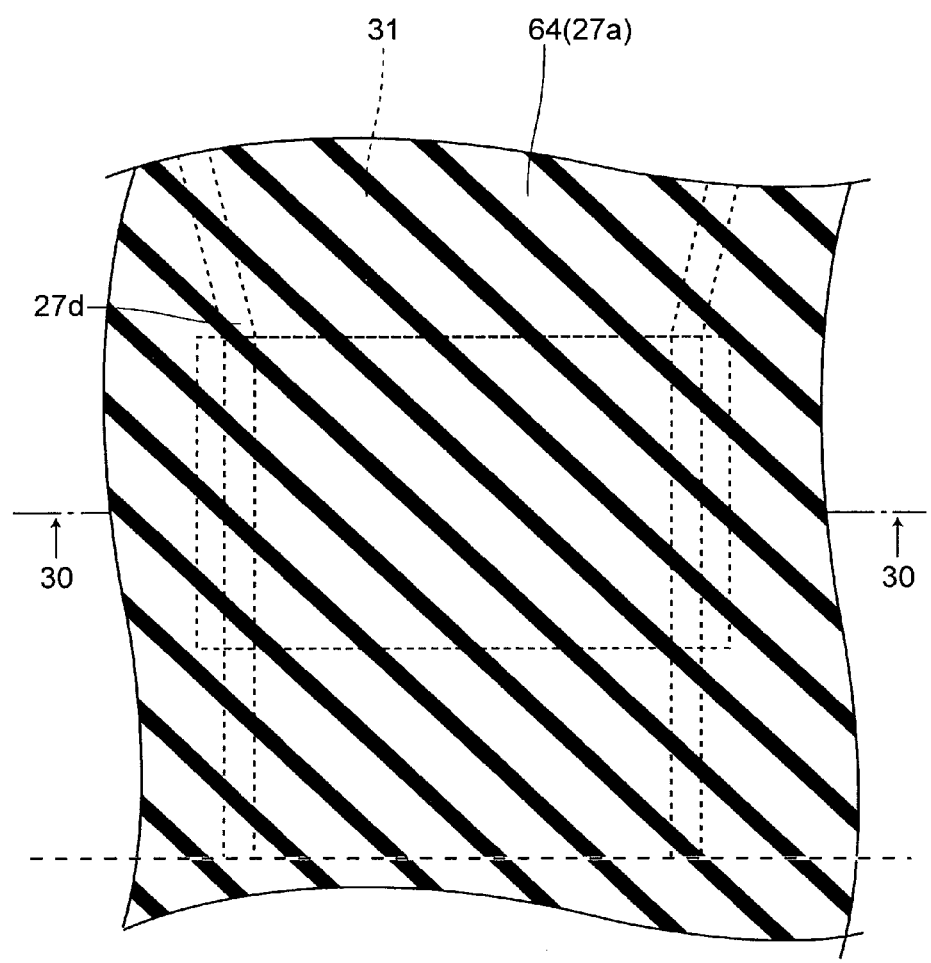
FIG. 23 is a plan view illustrating a principal part of a surface of laminated body in a process subsequent to that in FIG. 22.
Figure 24:
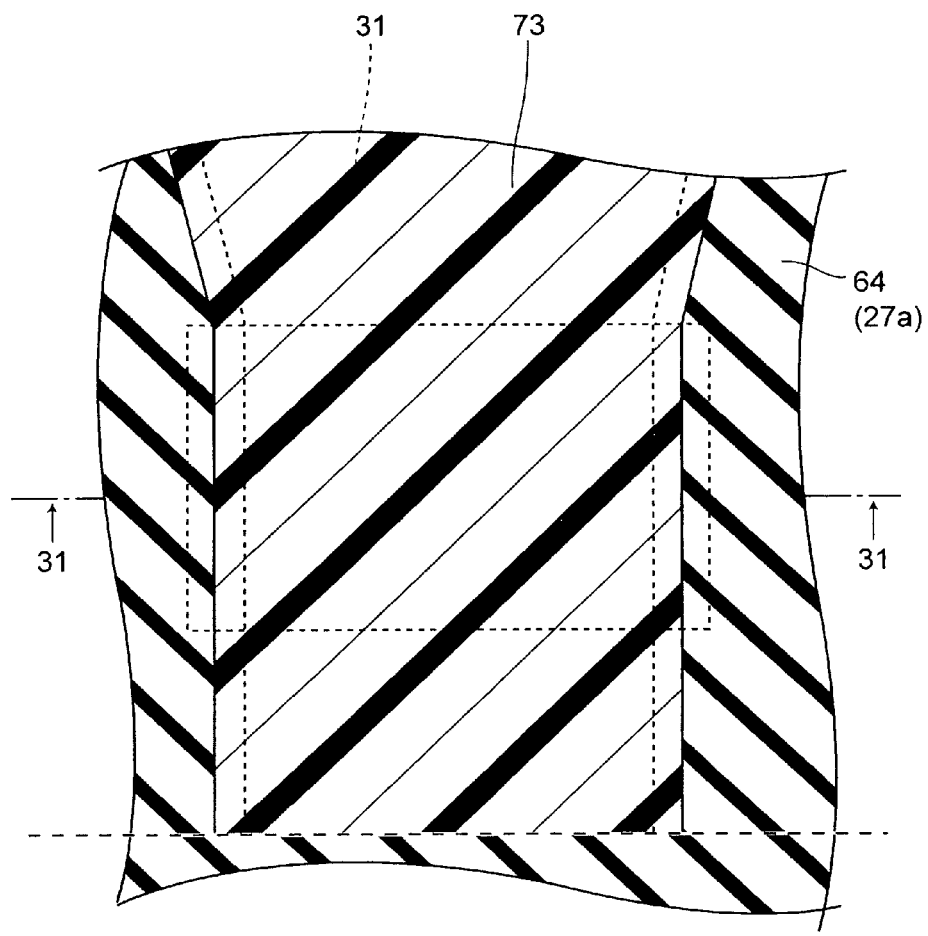
FIG. 24 is a plan view illustrating a principal part of a surface of laminated body in a process subsequent to that in FIG. 23.
Figure 25:
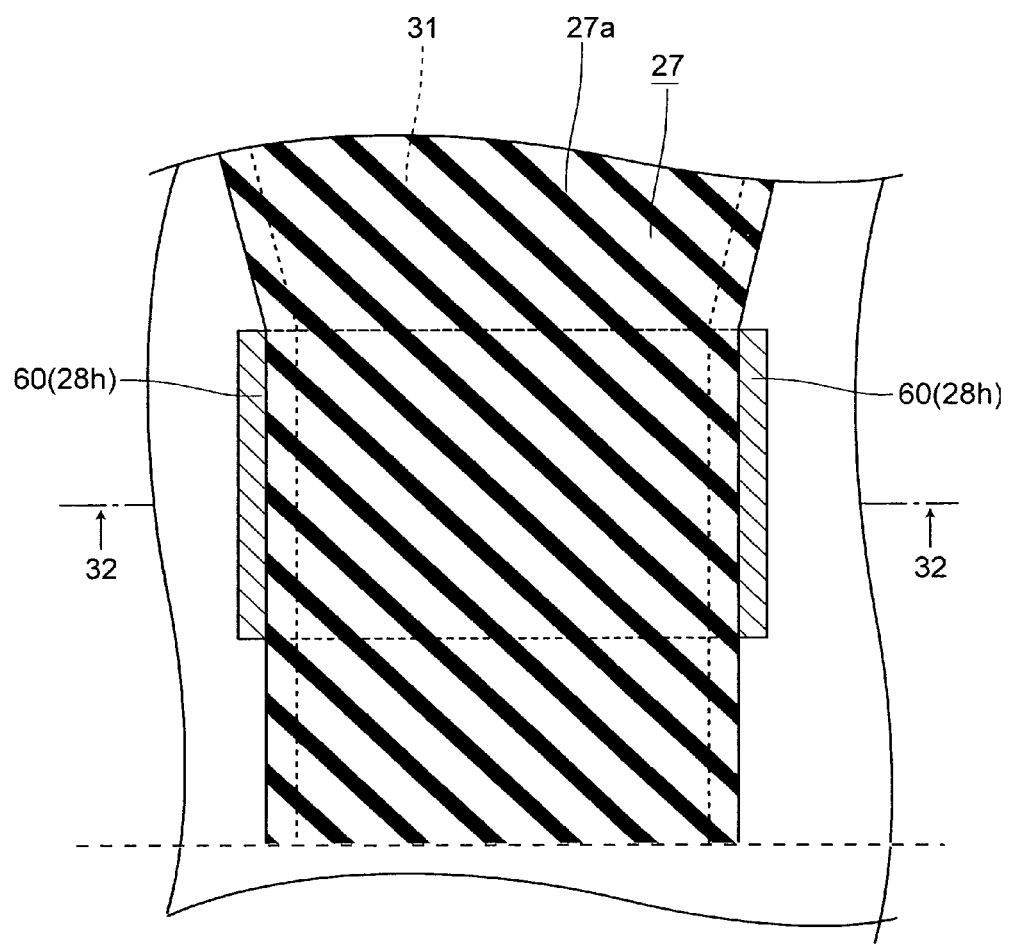
FIG. 25 is a plan view illustrating a principal part of a surface of laminated body in a process subsequent to that in FIG. 24.
Figure 30:
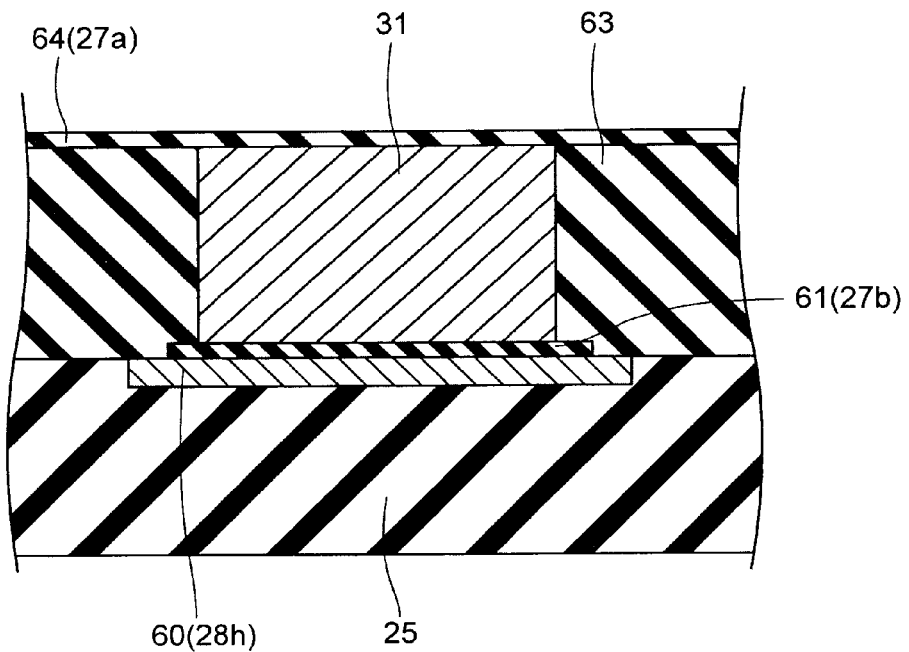
FIG. 30 is a sectional view taken along the line 30-30 in FIG. 23.
Figure 31:
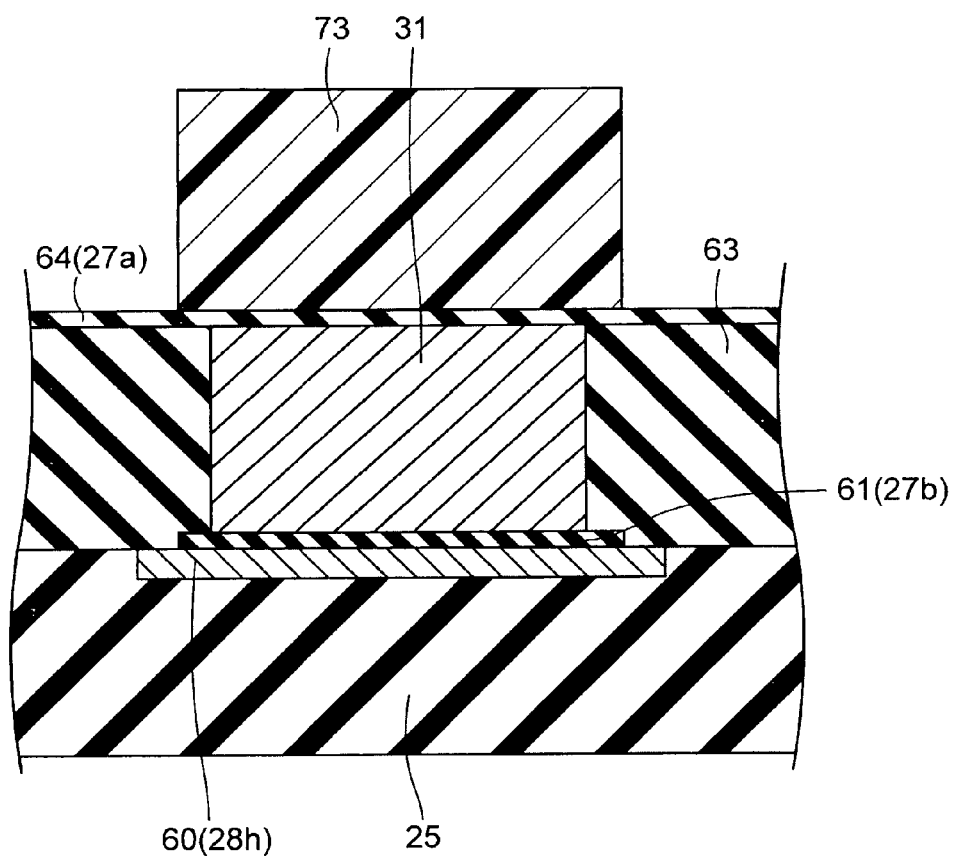
FIG. 31 is a sectional view taken along the line 31-31 in FIG. 24.
Figure 32:
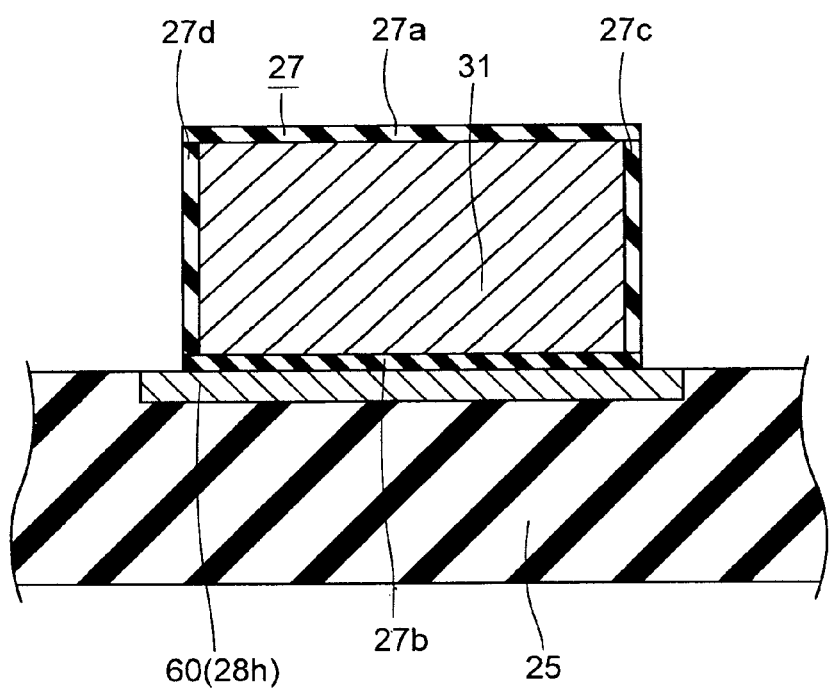
FIG. 32 is a sectional view taken along the line 32-32 in FIG. 25.

Next, a third dielectric substance layer forming step is performed, as illustrated in FIG. 23, FIG. 30. In this step, the third dielectric substance layer 64 is formed on the whole surface of the laminated body, for example, by the atomic layer deposition, using a dielectric substance such as alumina or the like.

Further subsequently, an interposed layer forming step is performed. In this step, photoresist is applied to the surface of the laminated body, after that, patterned using a predetermined photomask to form the photoresist layer 73. The photoresist layer 73 is formed such that the photoresist layer 73 covers a part of the third dielectric substance layer 64 where the optical waveguide 31 and the first dielectric substance layer 61 exist under it.

Next, using the photoresist layer 73 as a mask, etching is performed, so as to remove an outside part of the second dielectric substance layer 63 and the third dielectric substance layer 64 than the first dielectric substance layer 61. By this, remaining the second dielectric substance layer 63 and the third dielectric substance layer 64, and the first dielectric substance layer 61 after etching form the interposed layer 27. Further, surface of the embedded metal layer 60 exposes by this etching.

Subsequently, a near-field light generating layer forming step is performed. In this step, in addition to the embedded metal layer 60 (bottom base part 28h) formed until the above-described step, the base part 28e, the extended base parts 28f, 28g, and the near-field light generating part 28a are formed to form the near-field light generating layer 28. The base part 28e, the extended base parts 28f, 28g, and the near-field light generating part 28a are formed as in the following manner.

Figure 26:
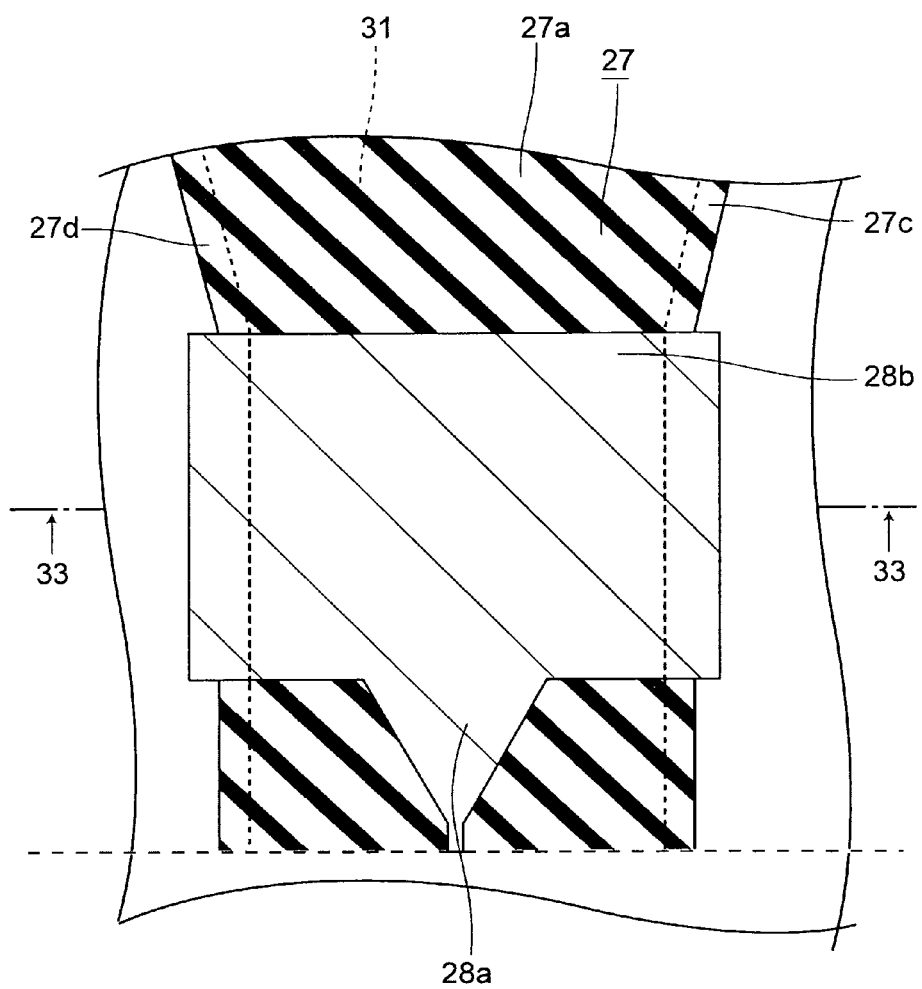
FIG. 26 is a plan view illustrating a principal part of a surface of laminated body in a process subsequent to that in FIG. 25.
Figure 33:
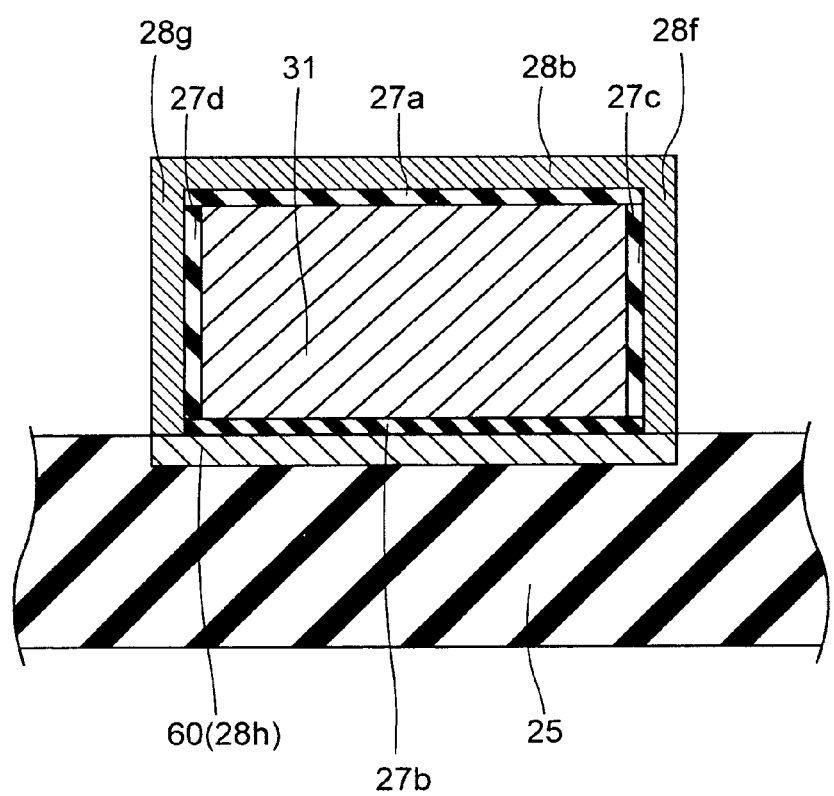
FIG. 33 is a sectional view taken along the line 33-33 in FIG. 26.

Specifically, the extended base parts 28f, 28g connected with the embedded metal layer 60 (bottom base part 28h) are formed, for example, by the sputtering or plating to form the base part 28e connected with the extended base parts 28f, 28g. Further, the near-field light generating part 28a is formed to be connected with the base part 28e. Thus, the near-field light generating layer 28 is formed as illustrated in FIG. 26, FIG. 33.

Next, as illustrated in FIGS. 15(A), (B), the surrounding dielectric substance layer 32 is formed using an insulating material such as alumina ($Al_2O_3$) or the like on the surface of the laminated body. Subsequently, the insulating layer 33 is formed using an insulating material such as alumina ($Al_2O_3$) or the like on the surface of the laminated body, and part of the insulating layer 33 where the magnetic pole end part layer 41 will be formed and part of the insulating layer 33 where the lower magnetic pole layer 45 will be formed are removed.

Thereafter, the magnetic pole end part layer 41 and the lower magnetic pole layer 45 are formed at the open parts of the insulating layer 33 on the surface of the laminated body, for example, by the frame plating method.

Next, an insulating layer 34 is formed on the surface of the laminated body using an insulating material such as alumina ($Al_2O_3$) or the like, and part of the insulating layer 34 where the connecting magnetic layer 42 will be formed and part of the insulating layer 34 where the middle magnetic pole layer 46 will be formed are removed.

Thereafter, the connecting magnetic layer 42 and the middle magnetic pole layer 46 are formed at the open parts of the insulating layer 34 on the surface of the laminated body, for example, by the frame plating method.

Further subsequently, the front magnetic layer 43 and the upper magnetic pole layer 47 are formed on the surface of the laminated body, for example, by the frame plating method. After that, an insulating layer 35 is formed on the surface of the laminated body using an insulating material such as alumina ($Al_2O_3$) or the like.

After that, the thin-film coil 10 including the four turn parts 11 is formed by the frame plating method. Further, photoresist is applied to the surface of the laminated body, as illustrated in FIG. 17 (A),(B), and then patterning is performed using a predetermined photomask to form the photoresist layer 75 covering the front magnetic layer 43, the thin-film coil 10 and the upper magnetic pole layer 47.

Next, the surface of the laminated body is polished by CMP for example, until the thin-film coil 10 emerges. Then, the yoke magnetic pole layer 44 is formed by the frame plating method. After that, after an overcoat layer 37 made of an insulating material such as alumina (Al$_2$O$_3$) or the like is formed on the whole surface of the laminated body, the thermally assisted magnetic head 100 is manufactured.

Modified Example 1

Figure 34:
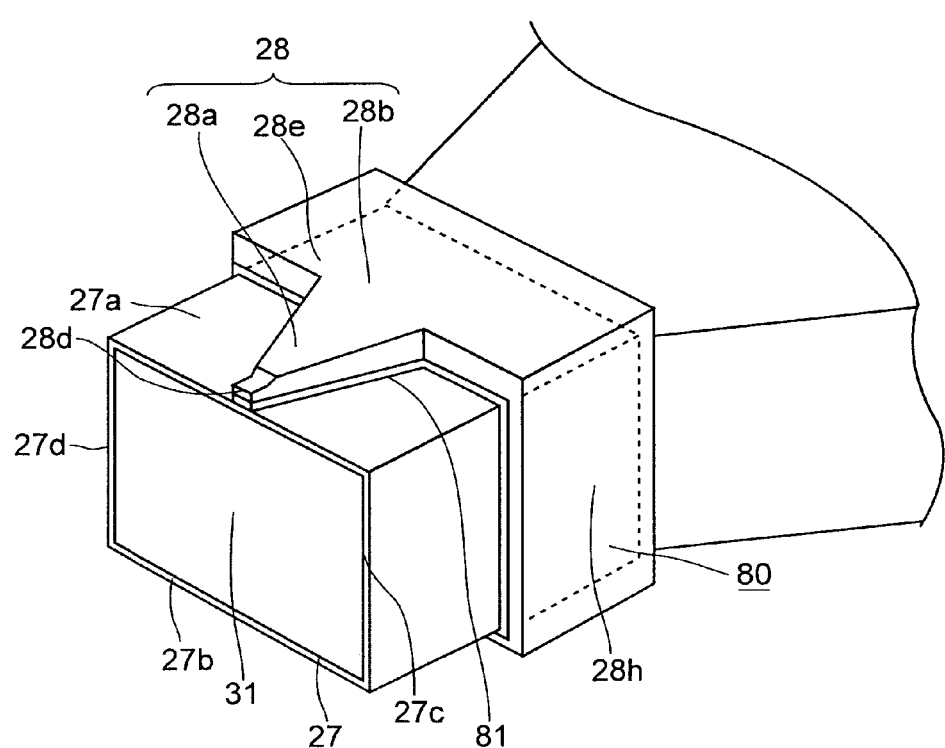
FIG. 34 is a perspective view illustrating an interposed layer, a near-field light generating layer and an optical waveguide of the thermally assisted magnetic head according to a modified example.

In the above-described thermally assisted magnetic head 100, the near-field light generating layer 28 has a single-layer structure using a metal such as Au, Ag, Ru or the like. In the thermally assisted magnetic head 100 in accordance with an embodiment of the present invention, a near-field light generating layer 80 illustrated in FIG. 34 may be formed in place of the near-field light generating layer 28.

The near-field light generating layer 80 has a double-layer structure. Namely, the near-field light generating layer 80 has a base metal layer 81 made of Au formed under the above-described the near-field light generating layer 28. The near-field light generating layer 80 has a double-layer structure which the base metal layer 81 is overlaid with the near-field light generating layer 28.

Further, the near-field light generating layer 80 has a bimetallic structure in which the metal constituting the base metal layer 81 and the metal constituting the near-field light generating layer 28 are different in kind. The metal constituting the base metal layer 81 is Au, and therefore the near-field light generating layer 28 is formed of meal other than Au (for example, Ag, Ru, Al, Cu, Pd, Pt, Rh, Ir, W or the like) or an alloy made of metal other than Au (for example, Ag, Ru, Al, Cu, Pd, Pt, Rh, Ir, W or the like).

Further, in the near-field light generating layer 80, the base metal layer 81 is arranged between the near-field light generating layer 28 and the interposed layer 27. Further, the base metal layer 81 is in direct contact with the interposed layer 27 and formed in a shape almost common to the near-field light generating layer 28.

Even when the thermally assisted magnetic head 100 has the near-field light generating layer 80 in the bimetallic structure, it is possible to prevent melting and deformation of the near-field light generating layer 80 and prevent melting, deformation, chipping of the main magnetic pole layer 40, as in the case having the near-field light generating layer 28. This is because the near-field light generating layer 80 also has the expanded part 28b similar to that of the near-field light generating layer 28.

Modified Example 2

Figure 35:
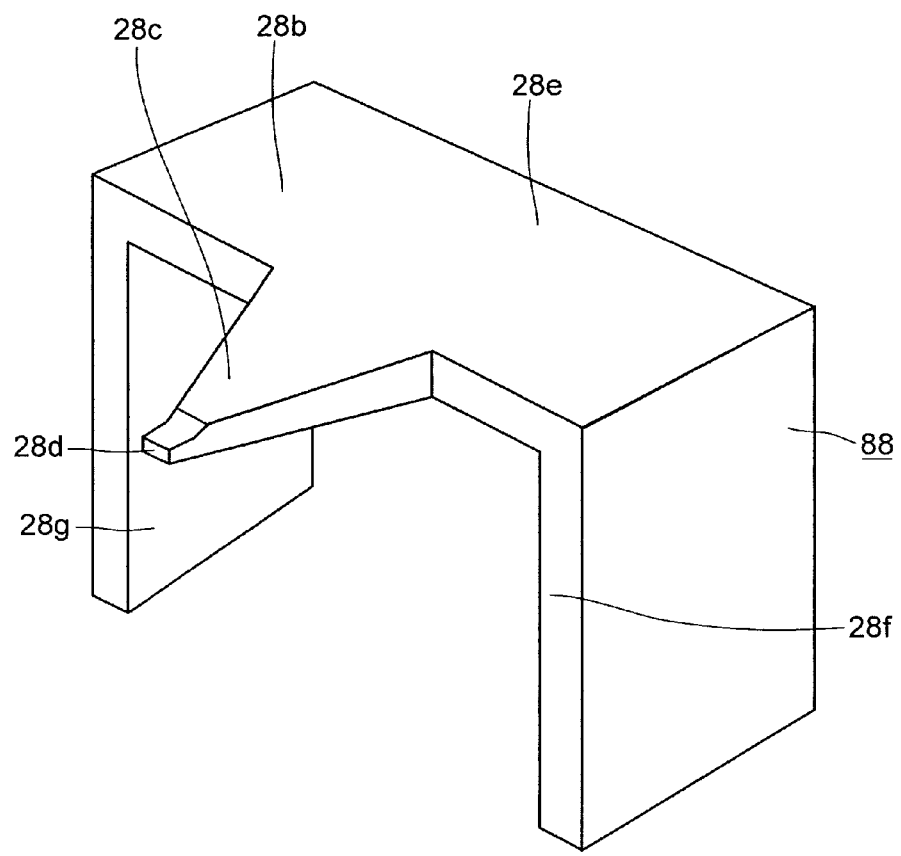
FIG. 35 is a perspective view illustrating a near-field light generating layer according to a modified example.
Figure 36:
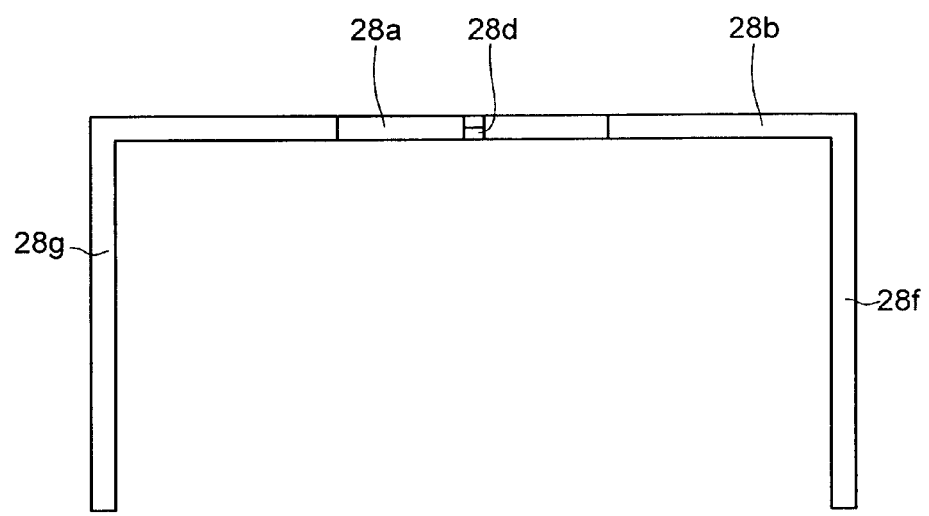
FIG. 36 is a front view illustrating a near-field light generating layer according to a modified example.

In the above-described thermally assisted magnetic head 100, the expanded part 28b of the near-field light generating layer 28 has the ring-like structure. In the thermally assisted magnetic head 100 according to the embodiment of the present invention, a near-field light generating layer 88 illustrated in FIG. 35, FIG. 36 may be formed in place of the near-field light generating layer 28.

The near-field light generating layer 88 has an expanded part 28b as in the near-field light generating layer 28.

However, the expanded part 28b of the near-field light generating layer 88 is different from the expanded part 28b of the near-field light generating layer 28 in that it does not have the bottom base part 28h. The expanded part 28b of the near-field light generating layer 88 has the base part 28e and the extended base parts 28f, 28g in the opposing arrangement structure, but does not have the bottom base part 28h.

Since the expanded part 28b of the near-field light generating layer 88 does not have the bottom base part 28h, the heat radiating function of the near-field light generating layer 88 may be slightly inferior to the heat radiating function of the near-field light generating layer 28.

However, the expanded part 28b of the near-field light generating layer 88 has the base part 28e and the extended base parts 28f, 28g in the opposing arrangement structure, and therefore melting and deformation of the near-field light generating layer 88 are able to be reduced. It is also possible to reduce chipping and deformation of the main magnetic pole layer 40.

Modified Example 3

Figure 37:
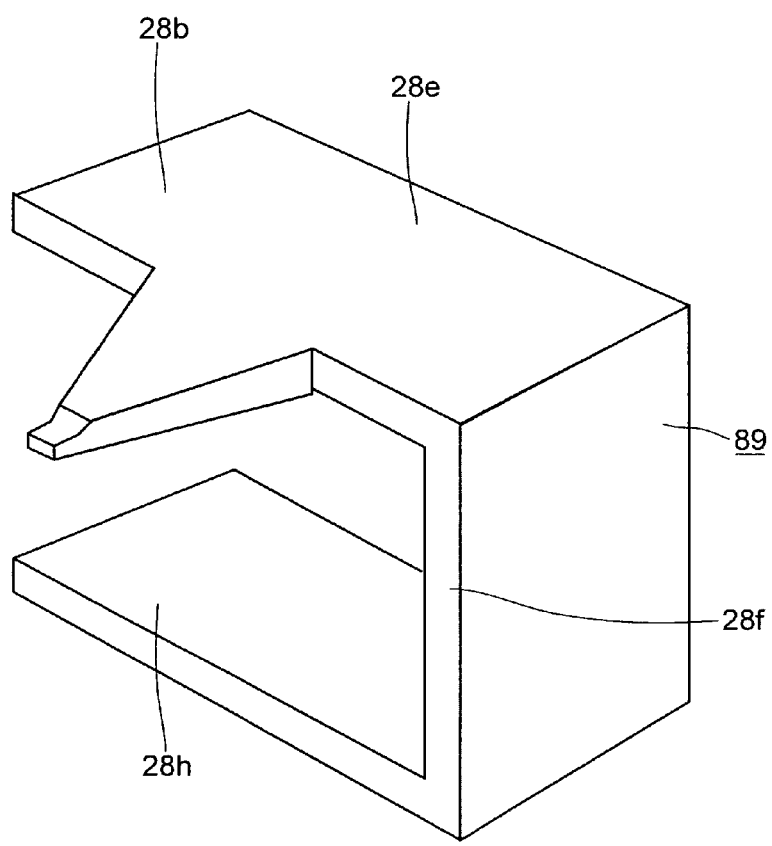
FIG. 37 is a perspective view illustrating a near-field light generating layer according to an another modified example.
Figure 38:
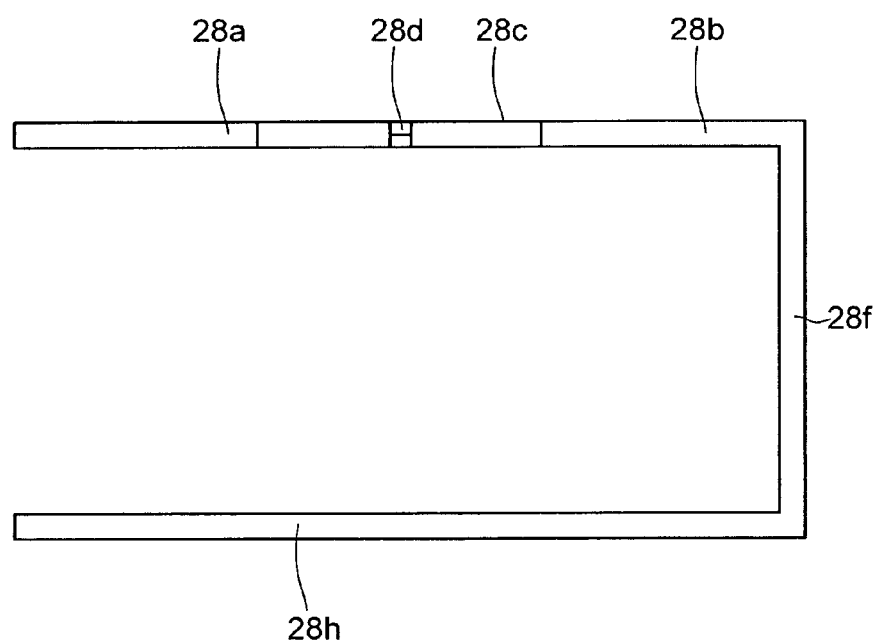
FIG. 38 is a front view illustrating a near-field light generating layer according to an another modified example.

Further, in the thermally assisted magnetic head 100 in accordance with an embodiment of the present invention, a near-field light generating layer 89 illustrated in FIG. 37, FIG. 38 may be formed in place of the near-field light generating layer 28.

The near-field light generating layer 89 has an expanded part 28b as in the near-field light generating layer 28.

However, the expanded part 28b of the near-field light generating layer 89 is different from the expanded part 28b of the near-field light generating layer 28 in that it does not have the extended base part 28g. The expanded part 28b of the near-field light generating layer 89 has the base part 28e, the extended base part 28f and the bottom base part 28h but does not have the extended base part 28g.

Since the expanded part 28b of the near-field light generating layer 89 does not have the extended base part 28g, the heat radiating function of the near-field light generating layer 89 may be slightly inferior to the heat radiating function of the near-field light generating layer 28.

However, the expanded part 28b of the near-field light generating layer 89 has the base part 28e, the extended base part 28f and the bottom base part 28h, and therefore melting and deformation of the near-field light generating layer 89 are able to be reduced. It is also possible to reduce chipping and deformation of the main magnetic pole layer 40.

Modified Example 4

Figure 39:
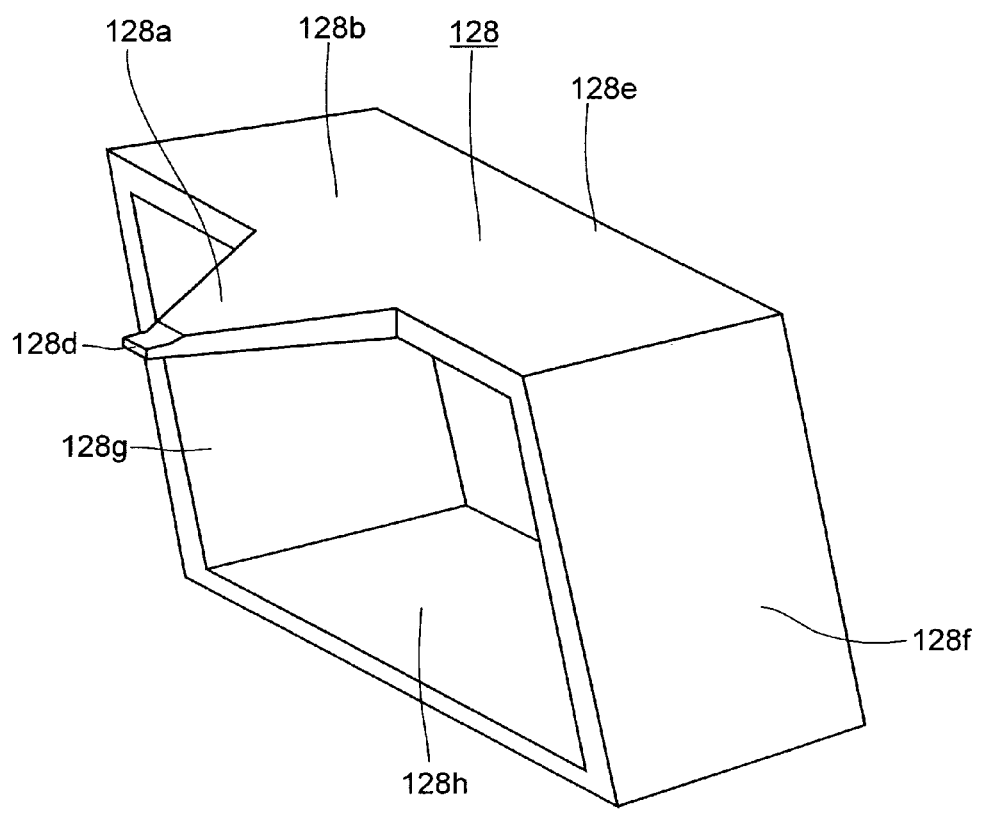
FIG. 39 is a perspective view illustrating a near-field light generating layer according to a still another modified example.
Figure 40:
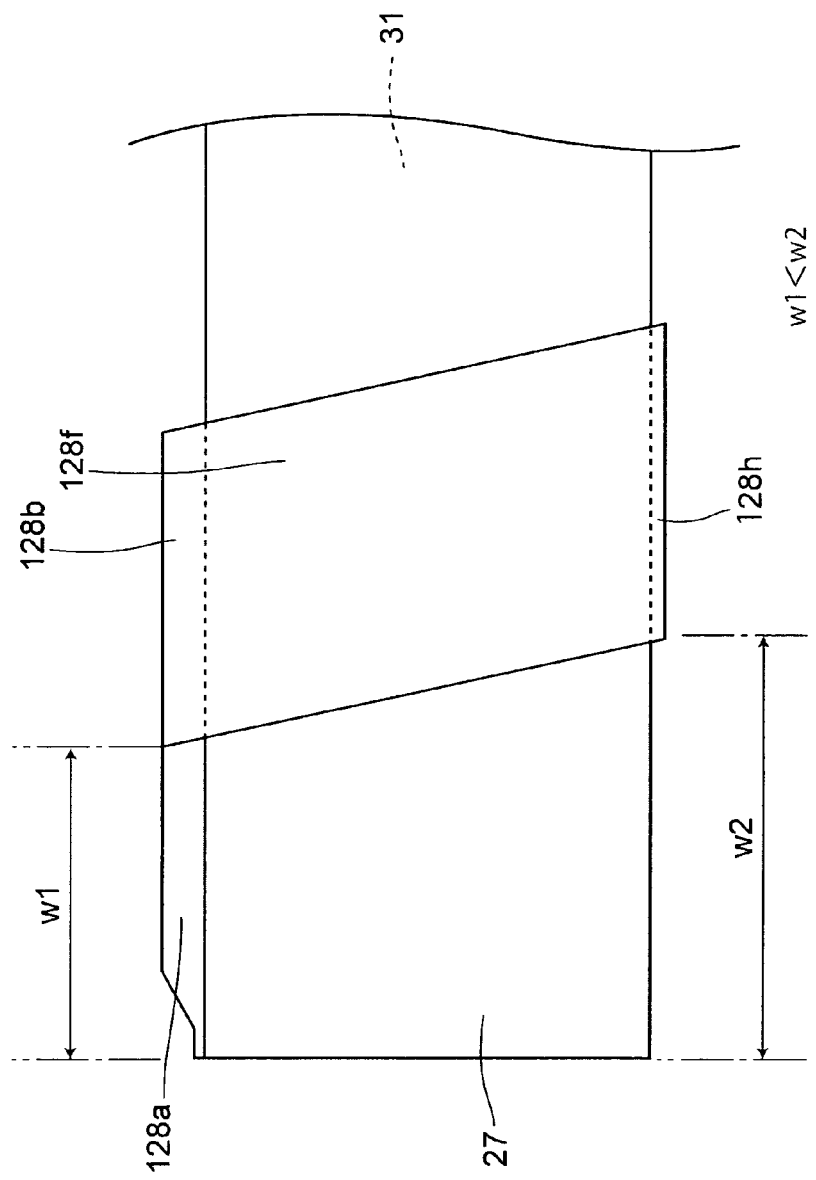
FIG. 40 is a perspective view illustrating an interposed layer, a near-field light generating layer and an optical waveguide according to a still another modified example.
Figure 41:
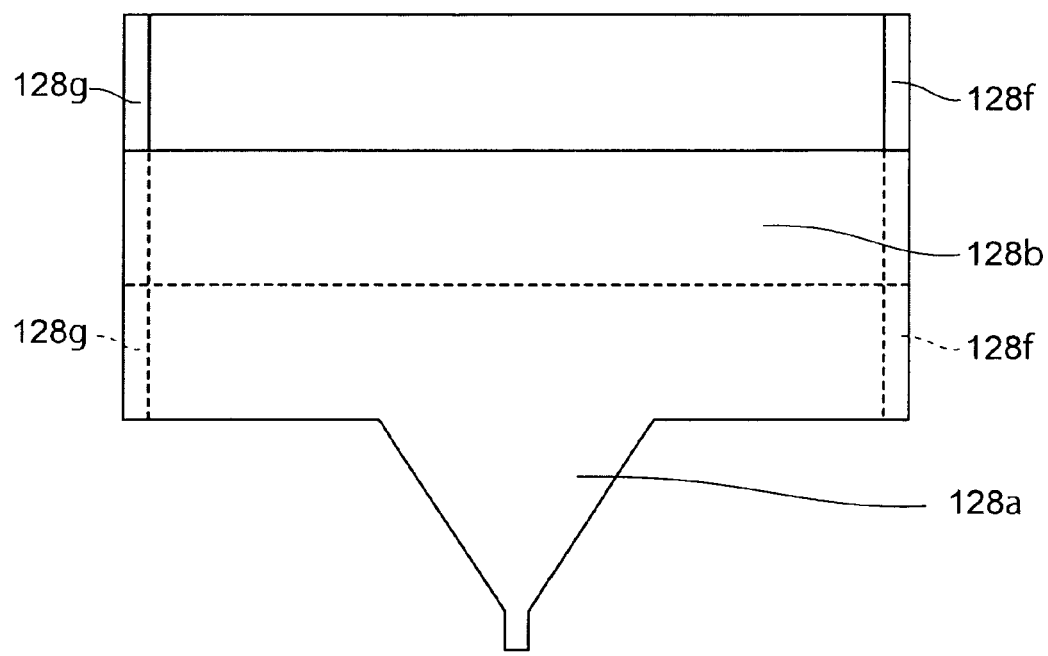
FIG. 41 is a plan view illustrating a near-field light generating layer according to a still another modified example.

Further, in the thermally assisted magnetic head 100 in accordance with an embodiment of the present invention, a near-field light generating layer 128 illustrated in FIG. 39 to FIG. 41 may be formed in place of the near-field light generating layer 28.

The near-field light generating layer 128 has a near-field light generating part 128a common to the near-field light generating part 28a and an expanded part 128b.

The expanded part 128b has a base part 128e, extended base parts 128f, 128g, and a bottom base part 128h. The expanded part 128b has a tilt structure unlike the expanded part 28b. The tilt structure means a structure in which the extended base parts 128f, 128g tilt with respect to the ABS 101 (in this case, not parallel with the ABS 101) as the bottom base part 128h is arranged at a position more distant from the ABS 101 than is the base part 128e.

The base part 128e is in common to the base part 28e. The bottom base part 128h is the same in shape and size as the bottom base part 28h but is different in that it is arranged at a position more distant from the ABS 101 than is the bottom base part 28h.

In the case of the above-described expanded part 28b, the distances of the base part 28e and the bottom base part 28h from the ABS 101 are the same.

In contrast, in the expanded part 128b, the distances of the base part 128e and the bottom base part 128h from the ABS 101 are different. More specifically, as illustrated in FIG. 40, a distance w2 of the bottom base part 128h from the ABS 101 is larger than a distance w1 of the base part 128e from the ABS 101 (w1<w2).

With the different distances of the base part 128e and the bottom base part 128h from the ABS 101, the extended base parts 128f, 128g tilt with respect to the ABS 101. More specifically, end parts of the extended base parts 128f, 128g on the bottom base part 128h side are more distant from the ABS 101 than are end parts on the base part 128e side, so that the extended base parts 128f, 128g tilt with respect to the ABS 101.

The near-field light generating layer 128 has the above-described expanded part 128b and therefore can prevent melting and deformation of the near-field light generating layer 128 as with the near-field light generating layer 28. It is also possible to prevent chipping and deformation of the main magnetic pole layer 40.

Further, since the expanded part 128b has the tilt structure, a part of the expanded part 128b distant from the ABS 101 is larger than that of the expanded part 28b. Accordingly, the heat radiating function of the expanded part 128b is further enhanced than the heat radiating function of the expanded part 28b. Therefore, the near-field light generating layer 128 can more surely prevent melting and deformation than the near-field light generating layer 28, and prevent chipping and deformation of the main magnetic pole layer 40.

Modified Example 5

In the thermally assisted magnetic head 100 in accordance with an embodiment of the present invention, a near-field light generating layer 129 illustrated in FIG. 42 may be formed in place of the near-field light generating layer 28.

The above-described near-field light generating layer 28 is formed to surround the reduced thickness part 31g of the optical waveguide 31 and the interposed layer 27.

However, the near-field light generating layer 129 is formed to surround the connecting part 31h of the optical waveguide 31 and the interposed layer 27.

The near-field light generating layer 129 has a near-field light generating part 129a and an expanded part 129b. The near-field light generating part 129a is formed to be larger in depth from the ABS 101 than is the near-field light generating part 28a.

The expanded part 129b is formed to surround the connecting part 31h. The expanded part 129b has a base part, extended base parts arranged to be oppose, and a bottom base part as with the expanded part 28b.

The near-field light generating layer 129 has the expanded part 129b and therefore can prevent melting and deformation of the near-field light generating layer 129 as with the near-field light generating layer 28. It is also possible to prevent chipping and deformation of the main magnetic pole layer 40.

Further, the expanded part 129b has a part distant from the ABS 101 larger than that of the expanded part 28b. Accordingly, the heat radiating function of the expanded part 129b is further enhanced than the heat radiating function of the expanded part 28b. Therefore, the near-field light generating layer 129 can more surely prevent melting and deformation than the near-field light generating layer 28, and surely prevent chipping and deformation of the main magnetic pole layer 40. Further, the expanded part 129b can more efficiently excite the surface plasmons than the expanded part 28b, and therefore can more surely prevent melting and deformation of the near-field light generating part 129a.

Modified Example 6

Figure 43:
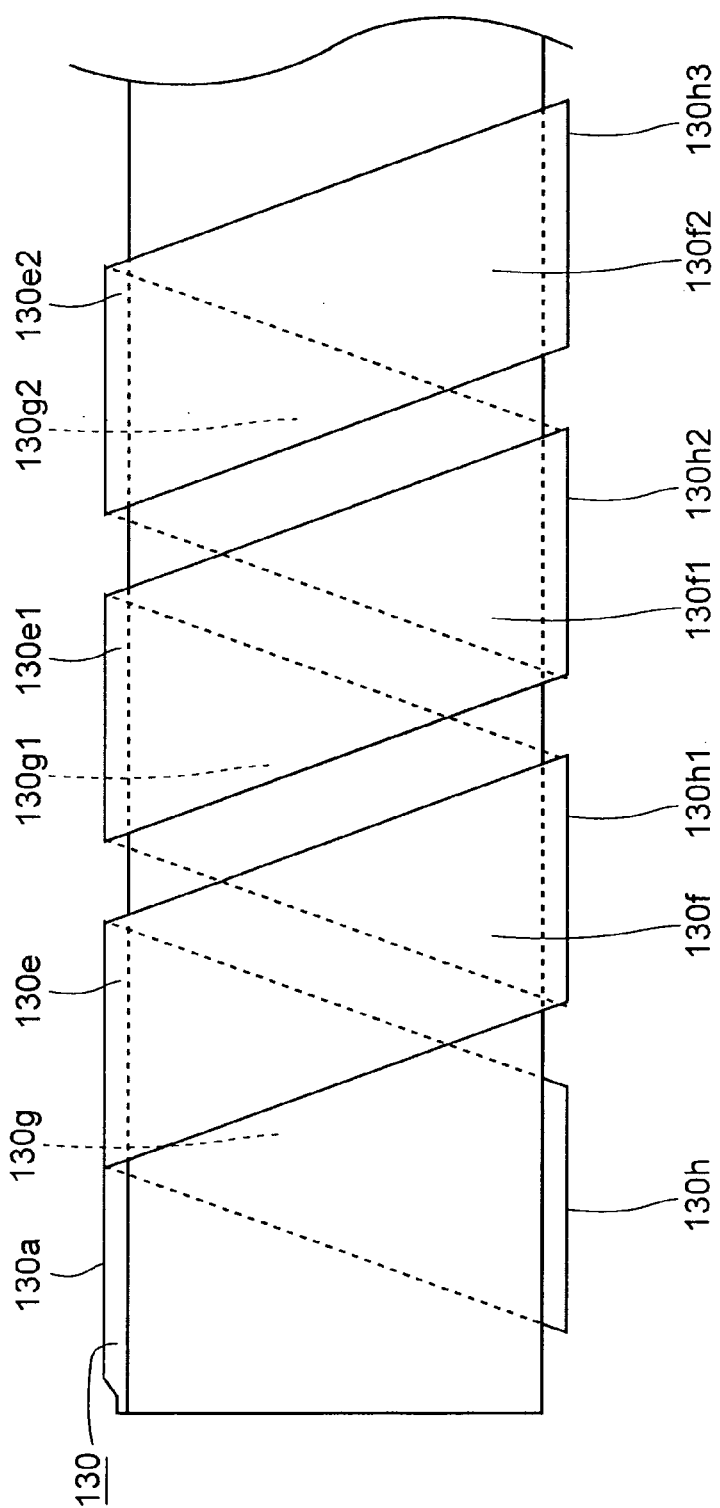
FIG. 43 is a side view illustrating a principal part of an interposed layer, a near-field light generating layer and an optical waveguide according to a still another modified example.
Figure 44:
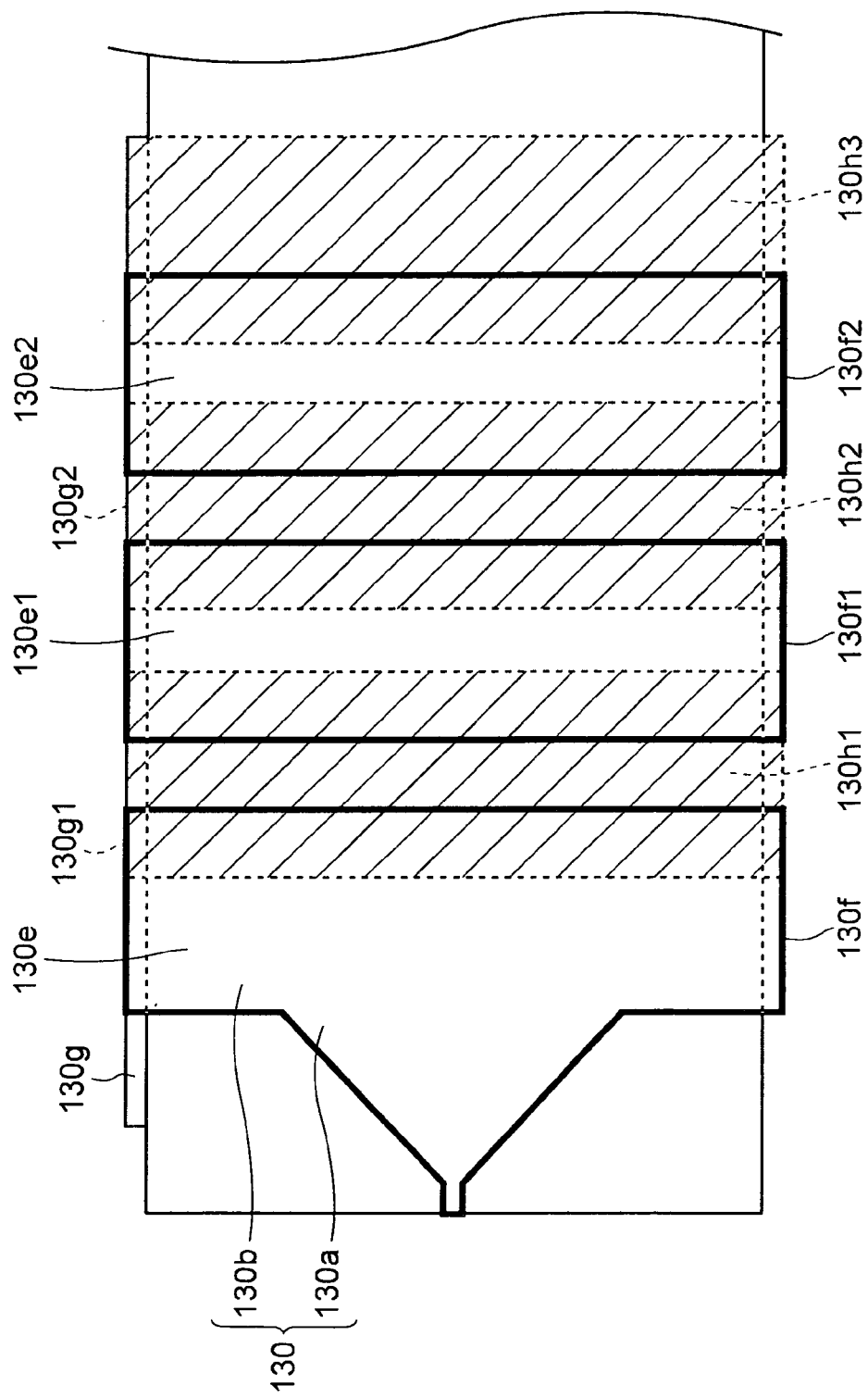
FIG. 44 is a plan view illustrating a principal part of an interposed layer, a near-field light generating layer and an optical waveguide according to a still another modified example.
Figure 45:
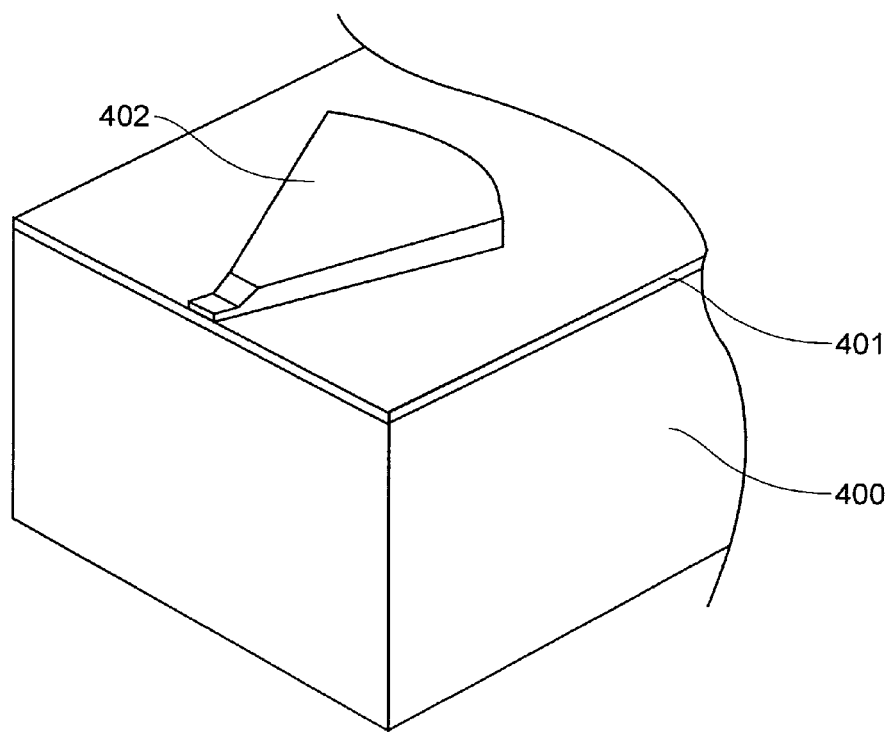
FIG. 45 is a plan view illustrating a principal part of a conventional interposed layer, near-field light generating layer and optical waveguide.

Further, in the thermally assisted magnetic head 100 in accordance with an embodiment of the present invention, a near-field light generating layer 130 illustrated in FIG. 43 to FIG. 44 may be formed in place of the near-field light generating layer 28.

The near-field light generating layer 130 has a near-field light generating part 130a common to the near-field light generating part 28a and an expanded part 130b.

Though the expanded part 28b has the ring-like structure in the case of the near-field light generating layer 28, the expanded part 130b has a spiral structure in the case of the near-field light generating layer 130.

The expanded part 130b has a base part 130e, extended base parts 130f, 130g, and a bottom base part 130h. The base part 130e is connected with an end part of the near-field light generating part 130a, which has the largest breadth and is distant from the ABS 101, as with the base part 28e.

Further, the respective extended base parts 130g, 130f are connected with end parts in the width direction of the base part 130e.

As illustrated in FIG. 43, the extended base part 130g is connected with the bottom base part 130h. Further, the extended base part 130g tilts to be more distant from the ABS 101 as it approaches from the bottom base part 130h to the base part 130e.

The extended base part 130f tilts to be more distant from the ABS 101 as it approaches from the base part 130e to a later-described bottom base part 130h1.

The base part 130e is arranged at a position more distant from the ABS 101 than is the bottom base part 130h.

Further, in the expanded part 130b, the bottom base part 130h, the extended base part 130g, the base part 130e, and the extended base part 130f are connected in this order in one body to extend in one turn in a spiral form around the optical waveguide 31 and the interposed layer 27.

Further, in the expanded part 130b, the bottom base part 130h1, an extended base part 130g1, a base part 130e1, and an extended base part 130f1 are similarly connected in this order in one body from the extended base part 130f, to extend in another turn in a spiral form around the optical waveguide 31 and the interposed layer 27.

Further, in the expanded part 130b, a bottom base part 130h2, an extended base part 130g2, a base part 130e2, and an extended base part 130f2 are similarly connected in this order in one body from the extended base part 130f1, to extend in still another turn in a spiral form around the optical waveguide 31 and the interposed layer 27. Accordingly, the expanded part 130b extends in three turns in a spiral form around the optical waveguide 31 and the interposed layer 27.

The near-field light generating layer 130 has the above-described expanded part 130b and therefore can prevent melting and deformation of the near-field light generating layer 130 as with the near-field light generating layer 28. Further, it is also possible to prevent chipping and deformation of the main magnetic pole layer 40.

In particular, the expanded part 130b extends in three turns in a spiral form around the optical waveguide 31 and the interposed layer 27. As compared to the expanded part 28b which extends only in one turn around the optical waveguide 31 and the interposed layer 27, the expanded part 130b has a part distant from the ABS 101 much larger than that of the expanded part 28b. The expanded part 130b has a part which can exhibit the heat radiating function much larger than that of the expanded part 28*b*, and therefore has a heat radiating function more significantly enhanced than that of the expanded part 28*b*. Further, the expanded part 130*b* can more efficiently excite the surface plasmons than the expanded part 28*b*, and can therefore more surely prevent melting and deformation of the near-field light generating part 130*a*.

Note that the near-field light generating layer 130 extends in three turns in a spiral form around the optical waveguide 31 and the interposed layer 27 but may extend in one turn or two turns in a spiral form around the optical waveguide 31 and the interposed layer 27.

(Embodiments of Head Gimbal Assembly and Hard Disk Drive)

Embodiments of the head gimbal assembly and hard disk drive will now be explained with reference to FIG. 46.

FIG. 46 (*a*) is a perspective view showing a hard disk drive 201 equipped with the above-mentioned thermally assisted magnetic head 100. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thermally assisted magnetic head 100.

The hard disk drive 201 positions a slider 230 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a semiconductor laser 207 generating laser light for heating, a control circuit 204 controlling recording/reproducing and the generation of light by the semiconductor laser 207, and an optical fiber 208 guiding the laser light to the slider 230.

The HGA 210 will now be described with reference to FIG. 46 (*b*). FIG. 46 (*b*) is a perspective view illustrating a rear face side of the HGA 210. In the HGA 210, the slider 230 is fixed to a tip portion of a suspension 220. Further, in the HGA 210, one end portion of a wiring member 224 is electrically connected to a terminal electrode of the slider 230.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

The slider 230 will be explained. The slider 230 has a slider base plate having the ABS 101 and a device formation part, and an output end part of the optical fiber 208 is inserted into the slider 230. Further, the thermally assisted magnetic head 100 is formed at the device formation part. This slider 230 floats from the magnetic recording medium 202 by a minute distance.

In the hard disk drive 201, when the HGA 210 is rotated, the slider 230 moves in a radial direction of the hard disk 202, i.e., a direction traversing track lines.

Since the aforementioned HGA 210 and hard disk drive 201 have the thermally assisted magnetic head 100, they are capable of preventing a melting and deformation of the near-field light generating layer, and are capable of preventing a deformation, melting and chipping of the magnetic layer arranged near the near-field light generating layer.

Though the above-mentioned embodiments explain a type in which a thin-film coil is wound like a flat spiral about the linking magnetic pole layer by way of example, the present invention is also applicable to a thermally assisted magnetic head of a type in which the thin-film coil is wound about the main magnetic pole layer.

What is claimed is:

1. A thermally assisted magnetic head comprising:
a main magnetic pole layer having a magnetic pole end face arranged within a medium-opposing surface opposing a magnetic recording medium;
a near-field light generating layer having a generating end part arranged within the medium-opposing surface, the generating end part generating near-field light for heating the magnetic recording medium; and
an optical waveguide guiding light to the near-field light generating layer,
wherein the optical waveguide has a waveguide end face arranged within the medium-opposing surface, and extends in a depth direction intersecting the medium-opposing surface from the waveguide end face, and has an upper end face on a side closer to the main magnetic pole layer,
wherein an interposed layer which is in direct contact with an outer surface of the optical waveguide including the upper end face is provided,
wherein the near-field light generating layer has a near-field light generating part having the generating end part and formed above the upper end face of the optical waveguide via the interposed layer, and an expanded part connected with the near-field light generating part at a position more distant from the medium-opposing surface than is the near-field light generating part and formed on an outer surface of the interposed layer, and
wherein the expanded part has a base part formed above the upper end face via the interposed layer, and an extended base part formed above a side face of the optical waveguide wherein the side face is connected with the upper end face via the interposed layer and connected with the base part.

2. The thermally assisted magnetic head according to claim 1,
wherein the optical waveguide further has a lower end face on a side distance from the main magnetic pole layer and opposed to the upper end face, and
wherein the expanded part of the near-field light generating layer further has a bottom base part connected with the extended base part and formed along the lower end face via the interposed layer.

3. The thermally assisted magnetic head according to claim 1,
wherein the optical waveguide further has a lower end face on a side distance from the main magnetic pole layer and opposed to the upper end face, and
wherein the extended base part of the near-field light generating layer have an opposing arrangement structure in which the extended base part is formed to be opposed to each other with the optical waveguide and the interposed layer intervening therebetween.

4. The thermally assisted magnetic head according to claim 1,
wherein the optical waveguide further has a lower end face on a side distance from the main magnetic pole layer and opposed to the upper end face, and
wherein the expanded part of the near-field light generating layer includes the base part, the extended base part, and a bottom base part formed along the lower end face via the interposed layer, and has a ring-like structure in which the expanded part is formed to surround the optical waveguide and the interposed layer.

5. The thermally assisted magnetic head according to claim 1,
wherein the optical waveguide further has a lower end face on a side distance from the main magnetic pole layer and opposed to the upper end face, and
wherein the expanded part of the near-field light generating layer includes the base part, the extended base part, and a bottom base part formed along the lower end face via the interposed layer, and has a spiral structure in which the expanded part is wound in a spiral form around the optical waveguide and the interposed layer.

6. The thermally assisted magnetic head according to claim 1,
wherein the optical waveguide has a rod-shaped part arranged at a position distant from the medium-opposing surface, a reduced thickness part smaller in thickness than the rod-shaped part and having the waveguide end face, and a connecting part connecting the rod-shaped part to the reduced thickness part while gradually reducing in diameter, and
wherein the expanded part of the near-field light generating layer has a ring-like structure in which the expanded part is formed to surround the reduced thickness part of the optical waveguide and the interposed layer.

7. The thermally assisted magnetic head according to claim 4,
wherein the expanded part of the near-field light generating layer has a tilt structure in which the bottom base part is arranged at a position more distant from the medium-opposing surface than is the base part.

8. The thermally assisted magnetic head according to claim 1,
wherein the near-field light generating layer has a bimetallic structure in which two metal layers are laminated and the respective metal layers are made of different kinds of metals.

9. The thermally assisted magnetic head according to claim 1,
wherein the optical waveguide has a rod-shaped part arranged at a position distant from the medium-opposing surface and formed in a rectangular parallelepiped shape, and a reduced thickness part formed in a rectangular parallelepiped shape smaller in thickness than the rod-shaped part and having the waveguide end face, and
wherein the interposed layer surrounds substantially the whole outer surface of the optical waveguide including the rod-shaped part and the reduced thickness part except the waveguide end face.

10. The thermally assisted magnetic head according to claim 1,
wherein the base part has a large width structure in which a width thereof in a direction along the medium-opposing surface is larger than a largest width of the near-field light generating part along the medium-opposing surface.

11. A method of manufacturing a thermally assisted magnetic head comprising a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, comprising:

an optical waveguide forming step of forming an optical waveguide on a surface of a laminated body to have a rectangular parallelepiped-shape part on a side of a planned medium-opposing surface position which will become the medium-opposing surface afterward;
an interposed layer forming step of forming an interposed layer using a dielectric substance on a side face and an upper end face of the optical waveguide; and
a near-field light generating layer forming step of forming a near-field light generating layer by forming an expanded part having an extended base part in contact with a part of the interposed layer arranged on the side face of the optical waveguide and a base part connected with the extended base part, at a position distant from the planned medium-opposing surface position, and forming a near-field light generating part having the generating end part and arranged above the upper end face of the optical waveguide via the interposed layer in a manner to be connected with the base part.

12. The method of manufacturing a thermally assisted magnetic head according to claim 11,
wherein in the near-field light generating layer forming step, the expanded part is formed to have an opposing arrangement structure in which the extended base part is arranged to be opposed to each other with the optical waveguide and the interposed layer intervening therebetween.

13. The method of manufacturing a thermally assisted magnetic head according to claim 11,
wherein in the near-field light generating layer forming step, the expanded part is formed to wind in a spiral form around the optical waveguide and the interposed layer.

14. A method of manufacturing a thermally assisted magnetic head comprising a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, comprising:

an embedded metal layer forming step of forming in a depression an embedded metal layer which will be a part of the near-field light generating layer afterward by forming a base insulating layer and then forming the depression at a position, on a surface of the base insulating layer, distant from a planned medium-opposing surface position which will become the medium-opposing surface;
a first dielectric substance layer forming step of forming, on a surface of a laminated body, a first dielectric substance layer in a band shape extending in a depth direction intersecting the medium-opposing surface from the planned medium-opposing surface position while covering a part of the embedded metal layer except both end parts along the medium-opposing surface;
an optical waveguide forming step of forming an optical waveguide to cover a part of the first dielectric substance layer except both side parts along the medium-opposing surface;
a second dielectric substance layer forming step of forming a second dielectric substance layer on the surface of the laminated body;
a flattening step of flattening the surface of the laminated body by polishing the surface of the laminated body until a surface of the optical waveguide is exposed;

a third dielectric substance layer forming step of forming a third dielectric substance layer on the surface of the laminated body;

an interposed layer forming step of forming an interposed layer from the first dielectric substance layer, and the second dielectric substance layer and the third dielectric substance layer left by removing parts of the second dielectric substance layer and the third dielectric substance layer outside the first dielectric substance layer; and a near-field light generating layer forming step of forming a near-field light generating layer by forming an expanded part having extended base parts connected with the embedded metal layer and a base part connected with the extended base parts, and forming a near-field light generating part having the generating end part in a manner to be connected with the base part.

15. The method of manufacturing a thermally assisted magnetic head according to claim 14, wherein in the optical waveguide forming step, the optical waveguide is formed to have a rod-shaped part arranged at a position distant from the planned medium-opposing surface position, a reduced thickness part smaller in thickness than the rod-shaped part and reaching the planned medium-opposing surface position, and a connecting part connecting the rod-shaped part to the reduced thickness part while gradually reducing in diameter, and wherein the expanded part of the near-field light generating layer is formed to surround the reduced thickness part of the optical waveguide and the interposed layer.

16. A head gimbal assembly comprising a slider having a thermally assisted magnetic head formed thereon, wherein the thermally assisted magnetic head comprising:

a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, wherein the optical waveguide has a waveguide end face arranged within the medium-opposing surface, and extends in a depth direction intersecting the medium-opposing surface from the waveguide end face, and has an upper end face on a side closer to the main magnetic pole layer, wherein an interposed layer which is in direct contact with an outer surface of the optical waveguide including the upper end face is provided, wherein the near-field light generating layer has a near-field light generating part having the generating end part and formed above the upper end face of the optical waveguide via the interposed layer, and an expanded part connected with the near-field light generating part at a position more distant from the medium-opposing surface than is the near-field light generating part and formed on an outer surface of the interposed layer, and wherein the expanded part has a base part formed above the upper end face via the interposed layer, and an extended base part formed above a side face of the optical waveguide wherein the side face is connected with the upper end face via the interposed layer and connected with the base part.

17. A hard disk drive comprising a head gimbal assembly having a thermally assisted magnetic head, and a magnetic recording medium opposing the thermally assisted magnetic head, wherein the thermally assisted magnetic head comprising:

a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, wherein the optical waveguide has a waveguide end face arranged within the medium-opposing surface, and extends in a depth direction intersecting the medium-opposing surface from the waveguide end face, and has an upper end face on a side closer to the main magnetic pole layer, wherein an interposed layer which is in direct contact with an outer surface of the optical waveguide including the upper end face is provided, wherein the near-field light generating layer has a near-field light generating part having the generating end part and formed above the upper end face of the optical waveguide via the interposed layer, and an expanded part connected with the near-field light generating part at a position more distant from the medium-opposing surface than is the near-field light generating part and formed on an outer surface of the interposed layer, and wherein the expanded part has a base part formed above the upper end face via the interposed layer, and an extended base part formed above a side face of the optical waveguide wherein the side face is connected with the upper end face via the interposed layer and connected with the base part.

* * * * *